United States Patent
Ueoka et al.

(10) Patent No.: US 9,531,783 B2
(45) Date of Patent: Dec. 27, 2016

(54) INFORMATION DISTRIBUTION DEVICE

(75) Inventors: Shohji Ueoka, Kobe (JP); Yuusaku Matsuda, Kobe (JP); Yuki Wakabayashi, Kobe (JP); Kazuma Fujiwara, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 526 days.

(21) Appl. No.: 13/807,206

(22) PCT Filed: Mar. 2, 2011

(86) PCT No.: PCT/JP2011/055442
§ 371 (c)(1),
(2), (4) Date: Dec. 27, 2012

(87) PCT Pub. No.: WO2012/002005
PCT Pub. Date: Jan. 5, 2012

(65) Prior Publication Data
US 2013/0107054 A1    May 2, 2013

(30) Foreign Application Priority Data

Jun. 29, 2010 (JP) ................. 2010-147800
Jun. 30, 2010 (JP) ................. 2010-148764

(51) Int. Cl.
*H04N 7/18* (2006.01)
*H04L 29/08* (2006.01)
(Continued)

(52) U.S. Cl.
CPC ........... *H04L 67/02* (2013.01); *G01C 21/3697* (2013.01); *G08G 1/09675* (2013.01);
(Continued)

(58) Field of Classification Search
CPC ............... G08G 1/127; G08G 1/09716; G08G 1/09675; G08G 1/09775; G01C 21/3697; H04N 67/02; H04N 7/18
(Continued)

(56) References Cited

U.S. PATENT DOCUMENTS 6,404,484 B1 * 6/2002 Sogawa .................. 356/3.14
7,444,238 B1 * 10/2008 Opitz .................... G01C 21/28
701/454

(Continued)

FOREIGN PATENT DOCUMENTS

EP    1 480 185 A2    11/2004
JP    A-05-282595    10/1993
(Continued)

OTHER PUBLICATIONS

Dec. 17, 2013 Office Action issued in Japanese Patent Application No. 2010-147800 (with English translation).
(Continued)

*Primary Examiner* — Behrooz Senfi
(74) *Attorney, Agent, or Firm* — Oliff PLC

(57) ABSTRACT

An information distribution device capable of distributing call attention information for calling attention to an event after confirming whether or not an event has occurred depending on circumstances is provided. A communication unit receives vehicle information, which relates to the behavior of a vehicle, and image information, which includes an image photographed by a vehicle has photographed, and distributes the call attention information for calling attention to an event, to a vehicle. A control unit determines whether or not to make a request to a vehicle for transmission of the image information, based on vehicle information or weather information, and makes a request to
(Continued)

| DETECTED EVENT | NONE | WEATHER (FALLEN SNOW ETC., ) | OBSTACLE (SMALL) | OBSTACLE (LARGE) | ACCIDENT (TRAFFIC ACCIDENT ETC., ) |
|---|---|---|---|---|---|
| FREQUENCY OF REQUEST FOR SPECIFIC POSITION INFORMATION | ONCE/60MIN | ONCE/30MIN | ONCE/20MIN | ONCE/10MIN | ONCE/5MIN | a vehicle for transmission of an image if it is determined to make a request for transmission of the image information.

10 Claims, 21 Drawing Sheets

(51) Int. Cl.
 *G01C 21/36* (2006.01)
 *G08G 1/0967* (2006.01)
 *G08G 1/127* (2006.01)

(52) U.S. Cl.
 CPC . *G08G 1/096716* (2013.01); *G08G 1/096775* (2013.01); *G08G 1/127* (2013.01); *H04N 7/18* (2013.01)

(58) Field of Classification Search
 USPC ......... 348/148, 151, 143; 382/155, 156, 180
 See application file for complete search history.

(56) References Cited

U.S. PATENT DOCUMENTS

| | | | | |
|---|---|---|---|---|
| 2003/0067542 | A1* | 4/2003 | Monroe | H04N 7/181 348/148 |
| 2003/0210806 | A1* | 11/2003 | Yoichi et al. | G08G 1/20 382/104 |
| 2004/0245853 | A1 | 12/2004 | Odagawa et al. | |
| 2007/0027583 | A1* | 2/2007 | Tamir et al. | 701/1 |
| 2007/0285512 | A1* | 12/2007 | Kitani et al. | 348/148 |
| 2008/0158361 | A1* | 7/2008 | Itoh | G08B 13/19602 348/155 |
| 2008/0166050 | A1* | 7/2008 | Yeh | G06K 9/00805 382/190 |
| 2008/0320036 | A1* | 12/2008 | Winter | G06F 17/30265 |
| 2010/0030540 | A1* | 2/2010 | Choi et al. | 703/8 |
| 2011/0102588 | A1* | 5/2011 | Trundle et al. | 348/143 |
| 2012/0062743 | A1* | 3/2012 | Lynam et al. | 348/148 |

FOREIGN PATENT DOCUMENTS

| | | |
|---|---|---|
| JP | A-11-154299 | 6/1999 |
| JP | A-2001-349735 | 12/2001 |
| JP | A-2004-348430 | 12/2004 |
| JP | A-2007-101418 | 4/2007 |
| JP | A-2007-102424 | 4/2007 |
| JP | A-2008-065529 | 3/2008 |
| JP | A-2008-077143 | 4/2008 |
| JP | A-2009-276255 | 11/2009 |

OTHER PUBLICATIONS

Jun. 21, 2011 International Search Report issued in Application No. PCT/JP2011/055442 (with translation).

* cited by examiner

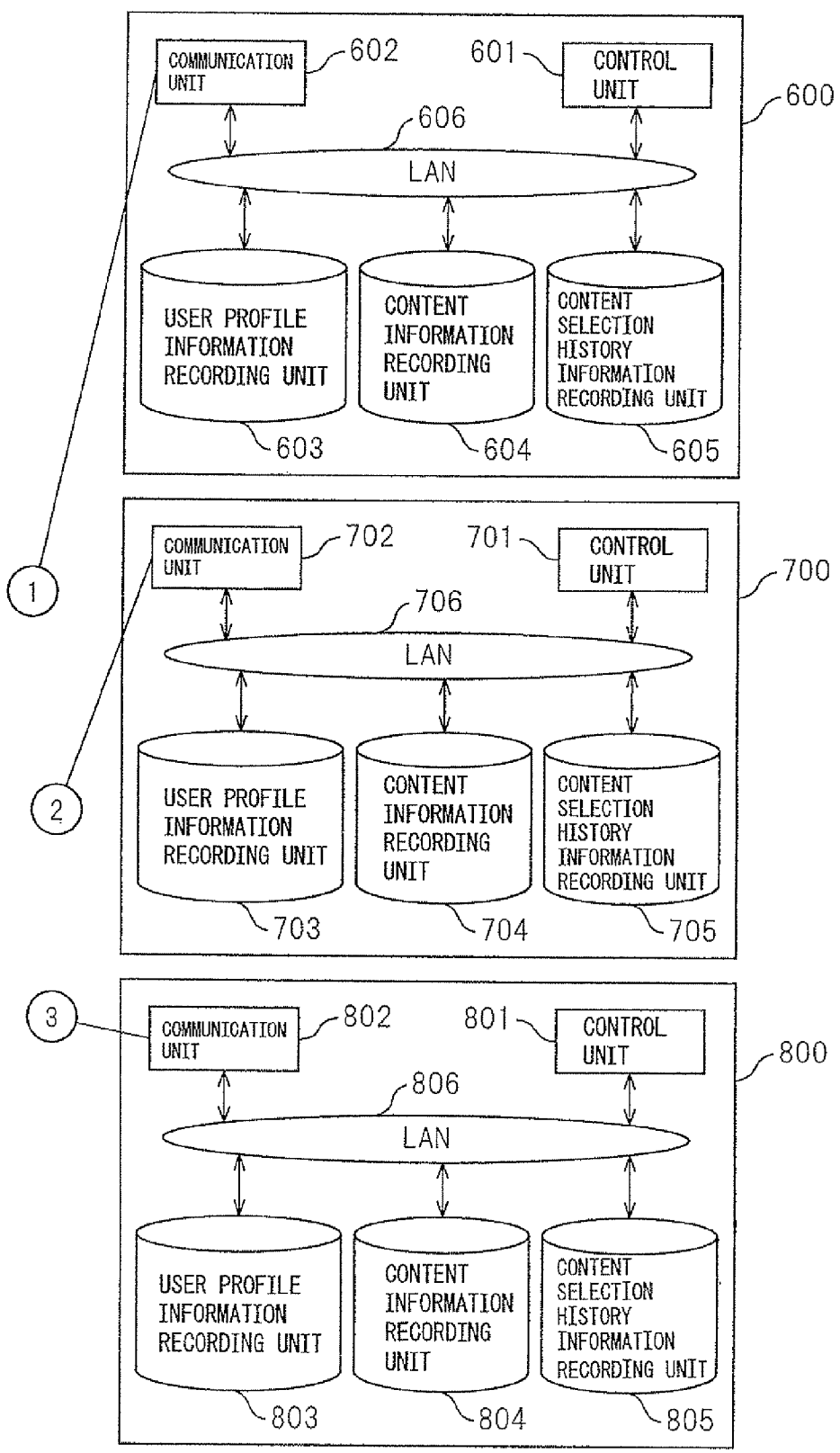

Fig.2A

| EVENT | POSITION | TIME |
|---|---|---|
| FALLEN SNOW | SANNOMIYA | 2010.2.21 18:12:37 |

Fig.2B

| EVENT | POSITION | TIME |
|---|---|---|
| TRAFFIC ACCIDENT | SANNOMIYA | 2010.2.21 18:34:15 |

Fig.2C

| EVENT | POSITION | TIME |
|---|---|---|
| OBSTACLE | MOTOMACHI | 2010.2.21 16:53:11 |

Fig.3A

| POSITION | PRESENCE/ABSENCE OF EVENT | EVENT |
|---|---|---|
| SANNOMIYA | PRESENT | FALLEN SNOW, TRAFFIC ACCIDENT |

Fig.3B

| POSITION | PRESENCE/ABSENCE OF EVENT | EVENT |
|---|---|---|
| MOTOMACHI | PRESENT | OBSTACLE |

Fig.3C

| POSITION | PRESENCE/ABSENCE OF EVENT | EVENT |
|---|---|---|
| HYOGO | ABSENT | — |

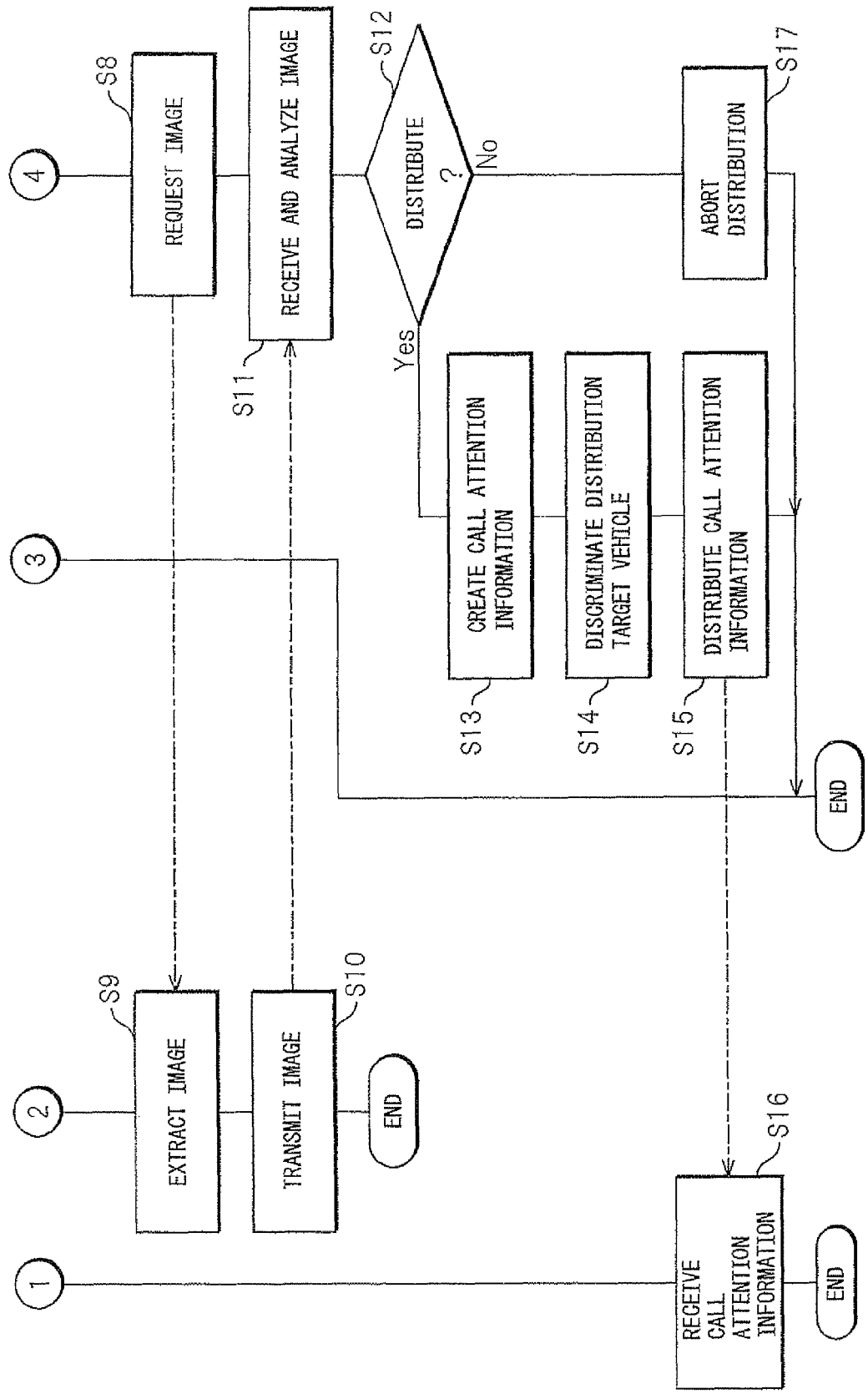

Fig.10

|  | NO NAVIGATION OR POINT OF EVENT IS NOT INCLUDED IN SEARCHED ROUTE OF NAVIGATION | POINT OF EVENT IS INCLUDED IN SEARCHED ROUTE OF NAVIGATION |
|---|---|---|
| WITHIN 1Km FROM POSITION OF EVENT | CALL ATTENTION INFORMATION IS DISTRIBUTED | CALL ATTENTION INFORMATION IS DISTRIBUTED |
| 1Km OR MORE DISTANT FROM POSITION OF EVENT | CALL ATTENTION INFORMATION IS NOT DISTRIBUTED | CALL ATTENTION INFORMATION IS DISTRIBUTED |

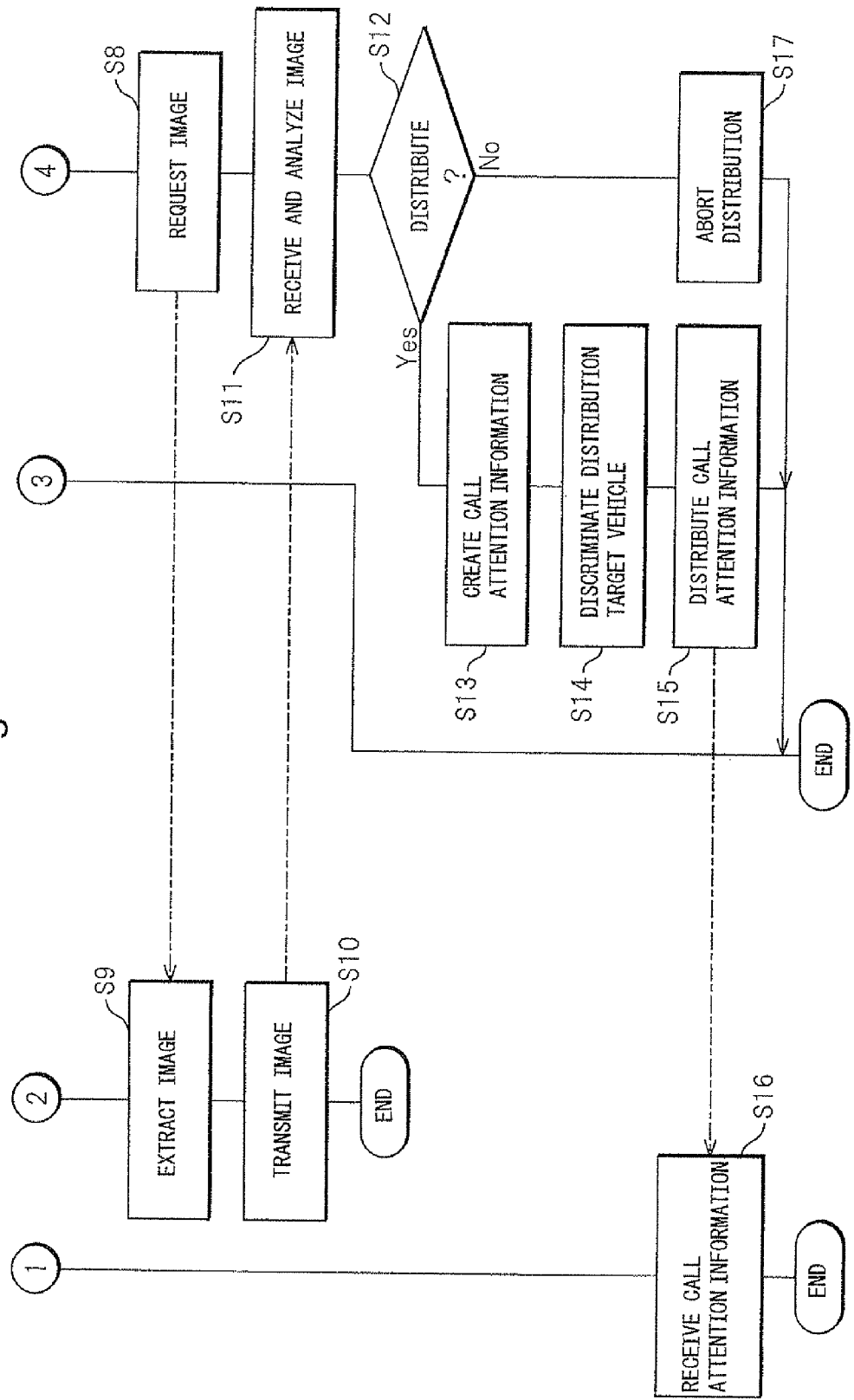

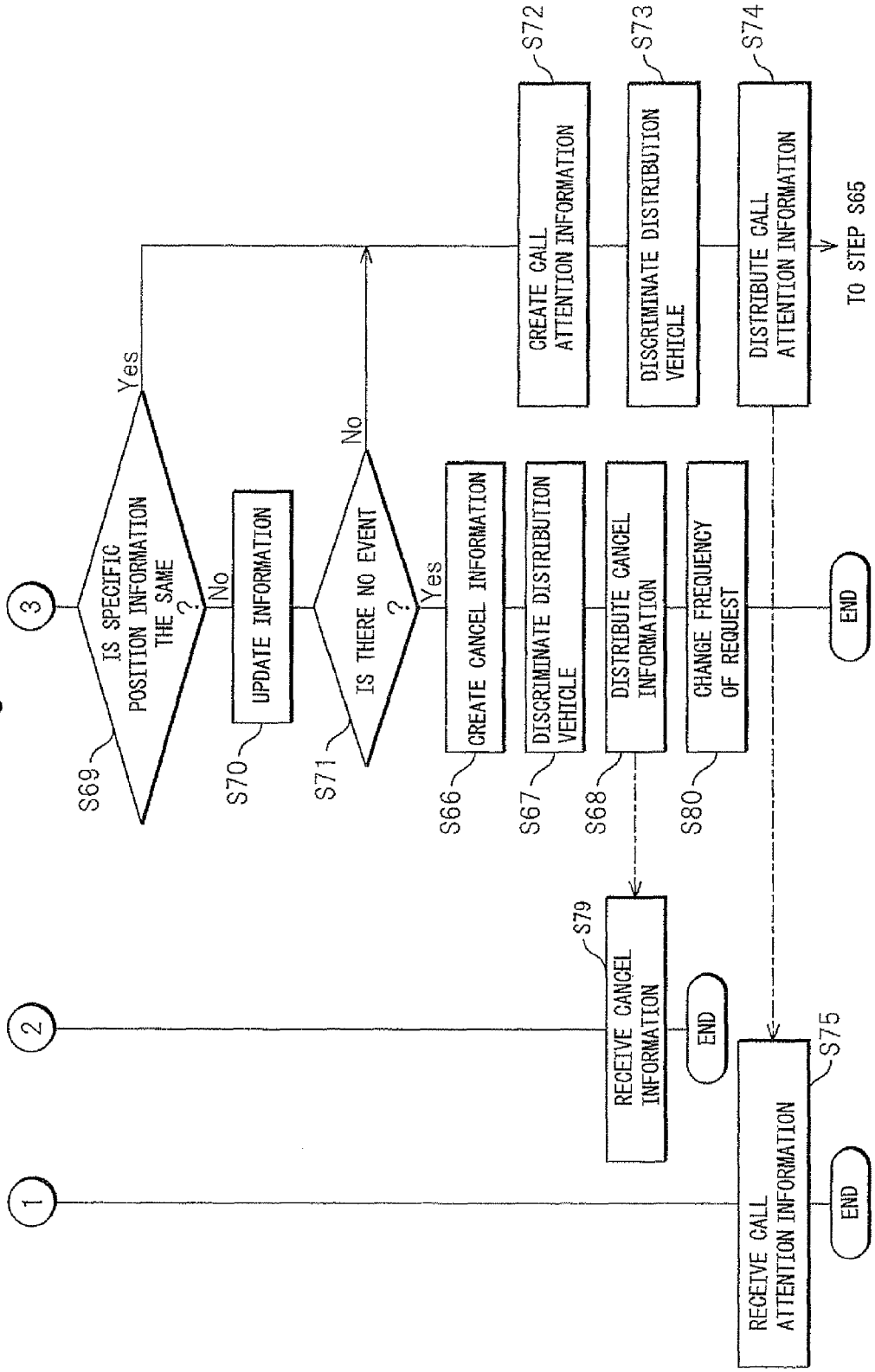

Fig.15

| DETECTED EVENT | NONE | WEATHER (FALLEN SNOW) ETC., | OBSTACLE (SMALL) | OBSTACLE (LARGE) | ACCIDENT (TRAFFIC ACCIDENT ETC.,) |
|---|---|---|---|---|---|
| FREQUENCY OF REQUEST FOR SPECIFIC POSITION INFORMATION | ONCE/60MIN | ONCE/30MIN | ONCE/20MIN | ONCE/10MIN | ONCE/5MIN |

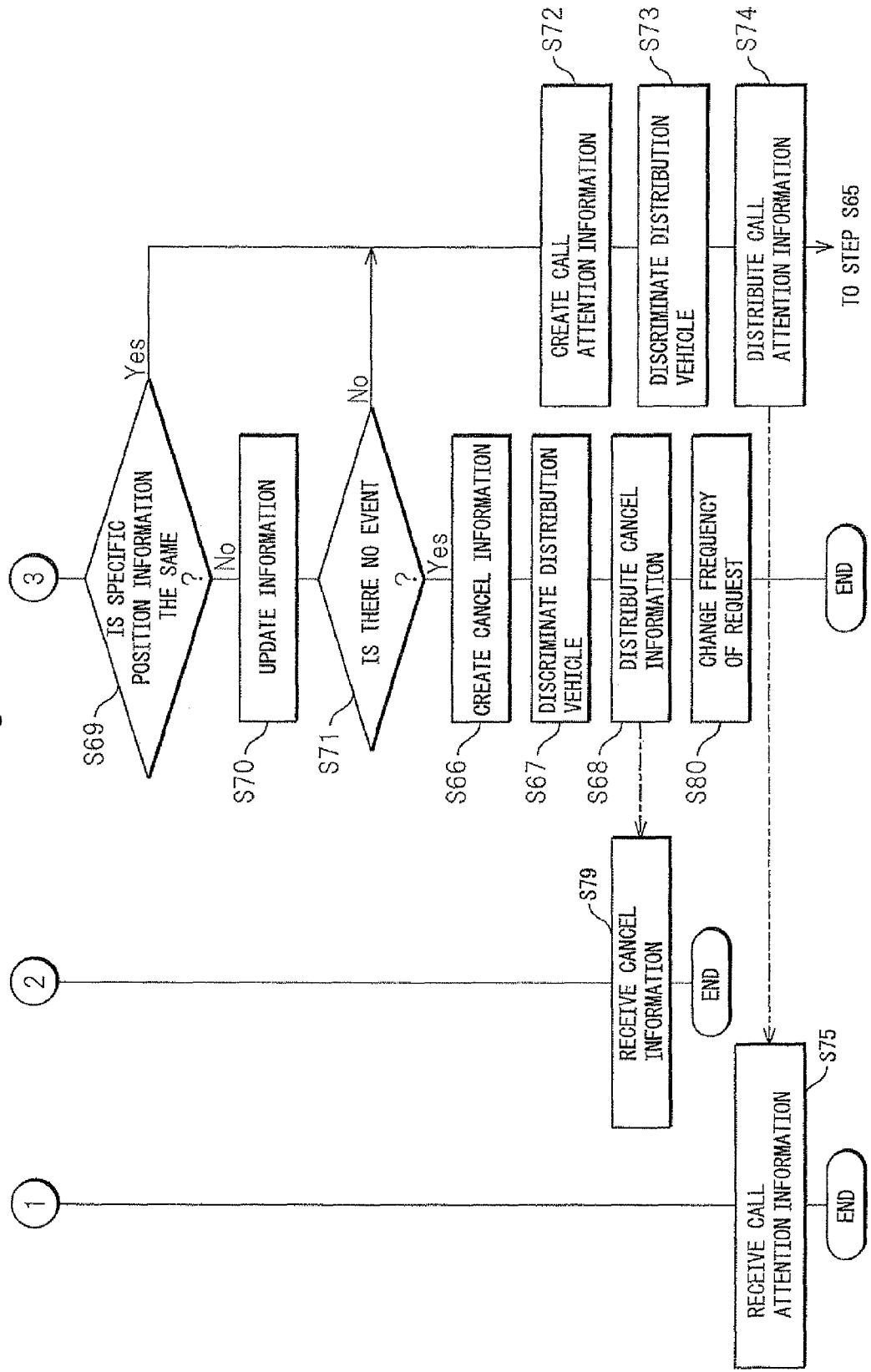

INFORMATION DISTRIBUTION DEVICE

TECHNICAL FIELD

The present invention relates to an information distribution device which distributes call attention information for calling attention to an event, to a vehicle based on at least one of image information, which includes an image photographed by an image pickup unit in a vehicle, vehicle information, which relates to the behavior of a vehicle, and weather information.

Further, the present invention relates to an information distribution device which distributes specific position information, which relates to circumstances of an event in a specific position stored in an external server, to a vehicle.

BACKGROUND ART

Conventionally, an information distribution device, which distributes call attention information for calling attention to an event, such as weather (for example, fallen snow) or traffic accident, to a vehicle, is proposed. (for example, PLTs 1 and 2). Such an information distribution device receives event information, which relates to the type of event and the position of an event, from a vehicle, which has detected an event, or an external server (for example, weather information providing server, road traffic information providing server), and distributes the call attention information to a vehicle near the position of an event, based on the received event information.

Further, an information distribution device, which acquires various kinds of information from an external server and distributes necessary information to a vehicle based on the acquired information, is proposed (for example, PLTs 3 and 4) Such an information distribution device acquires area information configured by a plurality of pieces of specific position information, which relates to circumstances of events (for example, weather, accident, obstacle) in a plurality of specific positions (for example, Sannomiya, Motomachi, Hyogo) in a predetermined area (for example, Kobe City), for each type of event, extracts each piece of specific position information from the area information, and transmits the specific positional information to relevant vehicles, respectively.

CITATION LIST

Patent Literatures

PLT 1: Japanese Unexamined Patent Publication (Kokai) No. 2007-101418
PLT 2: Japanese Unexamined Patent Publication (Kokai) No. 5-282595
PLT 3: Japanese Unexamined Patent Publication (Kokai) No. 2007-102424
PLT 4: Japanese Unexamined Patent Publication (Kokai) No. 11-154299

SUMMARY OF INVENTION

Technical Problem

Whether or not urgent distribution of the call attention information is requested is determined based on the type of event. For example, if an event relates to traffic information, such as a traffic accident, urgent distribution of the call attention information is requested, however, if an event relates to weather, such as fallen snow, urgent distribution of the call attention information is not necessarily requested and it is requested to verify whether or not the event information accurately reflects the current circumstances of the position of an event. However, the conventional information distribution device does not verify whether or not the event information accurately reflects the current circumstances of the position of an event even if urgent distribution of the call attention information is not requested.

Further, if the type of event is not determined on the vehicle side and vehicle information, which relates to the behavior of the vehicle, such as the vehicle speed, acceleration, and braking operation, is transmitted to the information distribution device from the vehicle, it is difficult for the information distribution device to determine the type of event from the vehicle information. On the other hand, if the information distribution device receives weather information from an external server and the information distribution device distributes the weather information to a vehicle, there is a case where the weather information does not reflect accurately the actual weather at the time of distribution of the weather information if there is a time lag between the time when the information distribution device receives the weather information and the time when the information distribution device distributes the weather information.

Furthermore, if image information, which includes an image photographed by the image pickup unit in a vehicle, is transmitted together with the vehicle information from the vehicle to the information distribution device for the purpose of accurate determination of an event that has occurred, the capacity of image information is large and there is a limit to the capacity of communication of a network between the vehicle and the information distribution device. Consequently, the time taken for the image information and vehicle information to reach the information distribution device from the vehicle is lengthened.

On the other hand, with the conventional information distribution device which distributes specific position information, which relates to circumstances of an event in a specific position stored in an external server, to a vehicle, it is possible to distribute various kinds of information collected from the external server or vehicle or necessary information extracted from collected various kinds of information, to each vehicle, however, the timing to distribute information is not taken into consideration in particular. As an example, a user (for example, a driver of the vehicle) desires to obtain information, which can be obtained after an event rather than information, which can be obtained before an event when acquiring some information, which relates to an event, from the information distribution device. When an accident, which is one of events, is considered, the circumstances of the road before an accident are quite different from the circumstances of the road after an accident, and therefore, it is very important for the user to know the influence of an accident in order for the user to select a road or to know the arrival time. However, the conventional distribution device does not take into consideration the fact that a user requests to obtain a lot of information after an accident. In other words, there is a disadvantage that it is not possible to inform the change of the circumstances in real time when the circumstances change from moment to moment, such as after an accident.

Further, the conventional information distribution device which distributes to a vehicle specific position information, which relates to circumstances of an event in a specific position stored in an external server, makes a request to a plurality of external servers for a plurality of pieces of area information whose amount is remarkably larger than an amount of one piece of specific position information in order to extract one piece of specific position information. For example, if the information distribution device acquires specific position information of Sannomiya, the information distribution device acquires weather information, which relates to the weather of Kobe City from a weather information center, acquires traffic information, which relates to the traffic in Kobe City from a traffic information center, and extracts the specific position information of Sannomiya from these weather information and traffic information. Consequently, there is a disadvantage that the burden of the information distribution device is large by acquiring a plurality of pieces of area information having a large amount of information as described above. Such a disadvantage is more remarkable if the frequency of requests for information by a user increases because the circumstances change from moment to moment, such as after an accident.

An object of the present invention is to provide an information distribution device capable of distributing call attention information for calling attention to an event after confirming whether or not an event has occurred depending on circumstances.

Another object of the present invention is to provide an information distribution device capable of increasing the frequency of requests to an external server for specific position information as the necessity to acquire the specific position information, which relates to circumstances of an event in a specific position, increases.

Solution to Problem

An information distribution device according to the present invention is an information distribution device which distributes call attention information for calling attention to an event, to a vehicle, based on at least one of image information, which includes an image photographed by an image pickup unit in a vehicle, vehicle information, which relates to the behavior of a vehicle, and weather information, having a first information acquisition unit configured to acquire at least one of the vehicle information and the weather information, an image transmission request determination unit configured to determine whether or not to make a request to the vehicle for transmission of the image information based on at least one of the vehicle information and the weather information acquired by the first information acquisition unit, an output unit configured to output a request to the vehicle for transmission of the image information if the image transmission request determination unit determines to make a request for transmission of the image information, a second information acquisition unit configured to acquire the image information from a vehicle that has responded to the request for transmission of the image information, a call attention information distribution determination unit configured to determine whether or not to distribute the call attention information to a vehicle, based on the image information acquired by the second information acquisition unit, and a first call attention information distribution unit configured to distribute the call attention information to a vehicle if the call attention information distribution determination unit determines to distribute the call attention information to a vehicle.

An information distribution device according to the present invention is an information distribution device which distributes specific position information, which relates to circumstances of an event in a specific position stored in an external server, to a vehicle, having an event information acquisition unit configured to acquire event information, which relates to the position of an event, from at least one of the vehicle and the external server and a specific position information acquisition unit configured to acquire the specific position information stored in the external server based on the position of an event acquired by the event information acquisition unit, wherein the specific position information acquisition unit makes the frequency of requests to the external server for specific position information after acquisition of the event information by the event information acquisition unit higher than the frequency of requests to the external server for specific position information before acquisition of the event information by the event information acquisition unit.

Advantageous Effects of Invention

According to the information distribution device of the present invention, if it is determined to make a request to a vehicle for transmission of image information, based on at least one of vehicle information and weather information, the information distribution device outputs a request to a vehicle for transmission of image information, and determines whether or not to distribute the call attention information to a vehicle, based on image information from a vehicle that has responded to the request for transmission of image information. Consequently, it is possible to distribute the call attention information after confirming whether or not an event has occurred depending on circumstances.

According to another information distribution device of the present invention, the frequency of requests to an external server for specific position information after acquisition of event information is made higher than the frequency of requests to an external server for the specific position information before acquisition of event information, and therefore, it is possible to increase the frequency of requests to an external server for the specific position information as the necessity to acquire the specific position information, which relates to circumstances of an event in a specific position, increases.

BRIEF DESCRIPTION OF DRAWINGS

FIG. 1C is a diagram showing an external server in the entire system including the information distribution device according to the present invention.

FIG. 2A, FIG. 2B, and FIG. 2C are diagrams each showing an example of event information.

FIG. 3A, FIG. 3B, and FIG. 3C are diagrams each showing an example of specific position information.

FIG. 9A and FIG. 9B are a flowchart of an example of the system operation.

FIG. 10 is a diagram for explaining an example of a reference of distribution of call attention information.

FIG. 12A and FIG. 12B are a flowchart of another example of the system operation.

FIG. 14A and FIG. 14B are a flowchart of another example of the system operation.

FIG. 15 is a diagram showing an example of a table showing a relationship between detected events and the frequency of requests.

FIG. 16A and FIG. 16B are a flowchart of another example of the system operation.

DESCRIPTION OF EMBODIMENTS

Hereinafter, embodiments according to the present invention are explained in detail with reference to the drawings. The technical scope of the present invention is not limited to these embodiments but covers the inventions described in claims and equivalents thereof. Further, it is also possible to carry out the present invention by an embodiment to which various modifications are made without departing from the scope of the present invention.

Figure 1A:
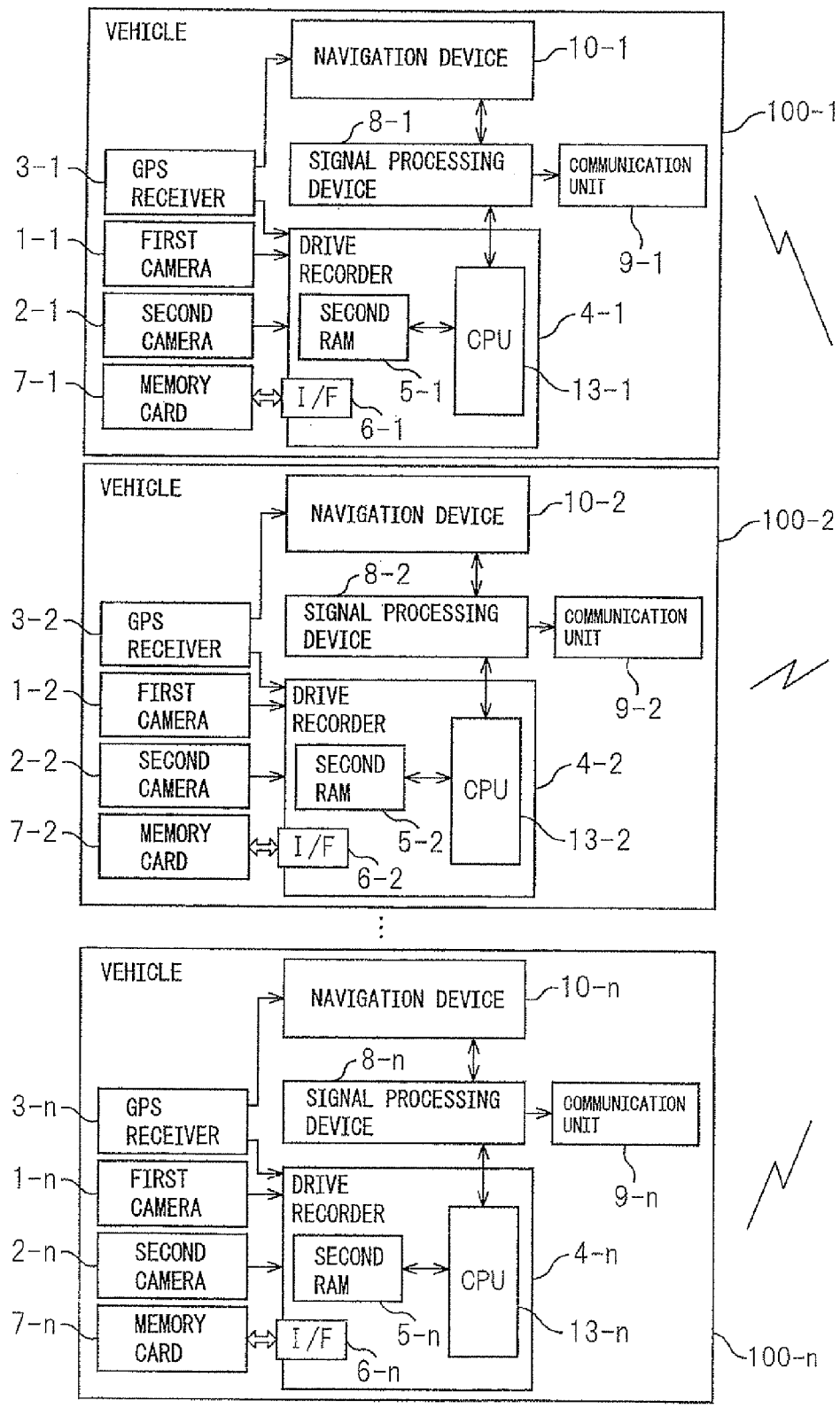
FIG. 1A is a diagram showing a vehicle in the entire system including an information distribution device according to the present information.
Figure 1B:
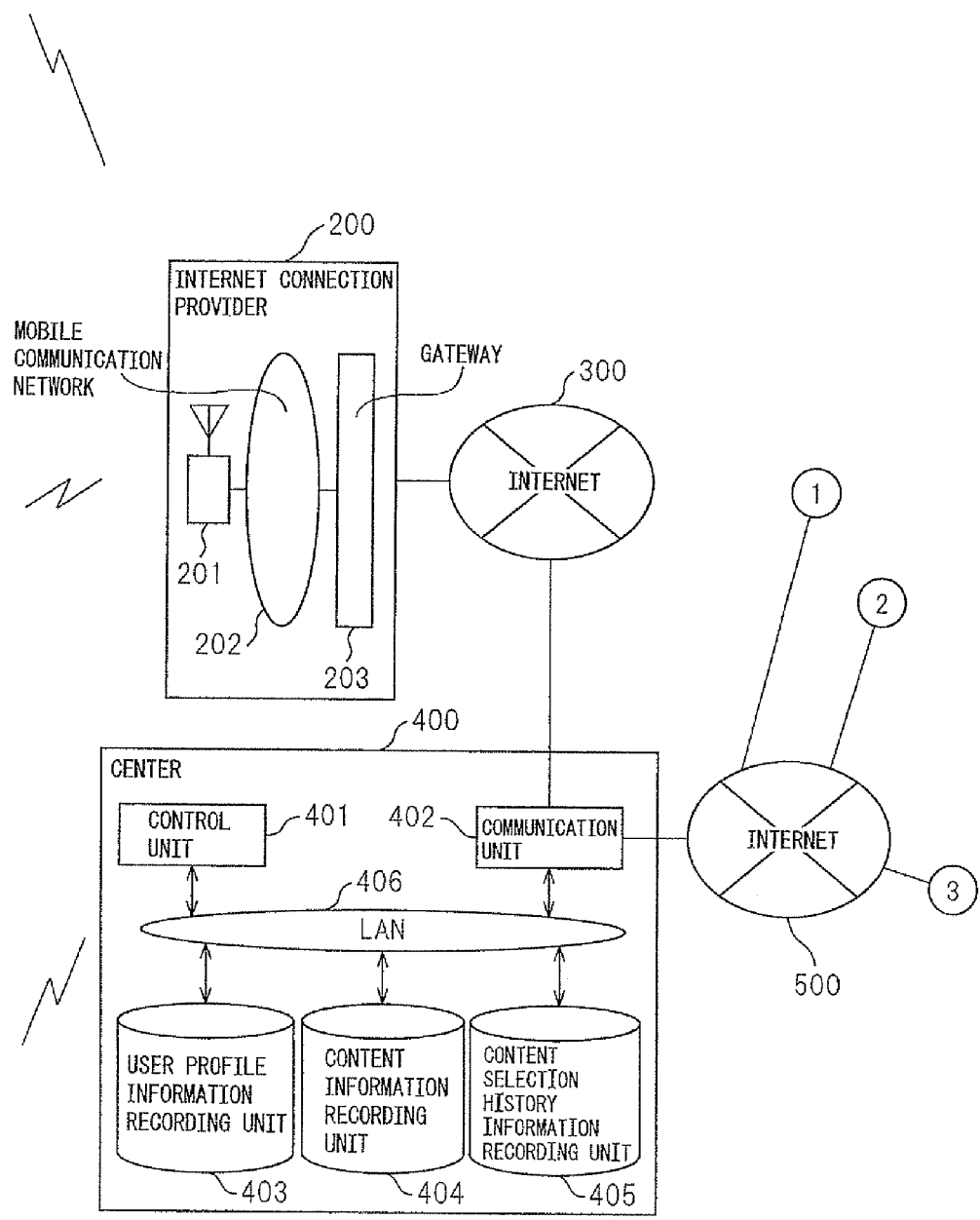
FIG. 1B is a diagram showing a center of the entire system including the information distribution device according to the present invention.

FIG. 1A is a diagram showing a vehicle in the entire system including an information distribution device according to the present invention, FIG. 1B is a diagram showing a center in the system, and FIG. 1C is a diagram showing an external server in the system.

Vehicles 100-1, 100-2, . . . , 100-$n$ can connect to an Internet 300 via an Internet connection provider 200, as will be explained later in detail, and are configured so as to be capable of accessing a center 400 as an information distribution device on a Web. Further, the center 400 is configured so as to be capable of recording various kinds of information, which is acquired from external servers 600, 700, and 800 via an Internet 500, in an internal database and to be capable of distributing various kinds of information to the vehicles 100-1, 100-2, . . . , 100-$n$, in order to control the plurality of the vehicles 100-1, 100-2, . . . , 100-$n$ at the same time.

Drive recorders 4-1, 4-2, . . . , 4-$n$, which are connected to first cameras 1-1, 1-2, . . . , 1-$n$, second cameras 2-1, 2-2, . . . , 2-$n$, GPS (Global Positioning System) receivers 3-1, 3-2, . . . , 3-$n$, etc., are mounted on the vehicles 100-1, 100-2, . . . , 100-$n$, respectively. The drive recorders 4-1, 4-2, . . . , 4-$n$ continuously record image data, which is picked up by the first cameras 1-1, 1-2, . . . , 1-$n$ and the second cameras 2-1, 2-2, . . . , 2-$n$, into second RAMs 5-1, 5-2, . . . , 5-$n$, and write the image data, which is recorded in the second RAMs 5-1, 5-2, . . . , 5-$n$, into memory cards 7-1, 7-2, . . . , 7-$n$, which is inserted into interfaces (I/F) 6-1, 6-2, . . . , 6-$n$ at a predetermined unit (for example, a unit of file) while an ACC switch is ON. The drive recorders 4-1, 4-2, . . . , 4-$n$ can communicate with the Internet connection provider 200 via communication units 9-1, 9-2, . . . , 9-$n$, which is connected to signal processing devices 8-1, 8-2, . . . , 8-$n$, respectively. Consequently, the signal processing devices 8-1, 8-2, . . . , 8-$n$ and/or the drive recorders 4-1, 4-2, . . . , 4-$n$ of the vehicles 100-1, 100-2, . . . , 100-$n$ and the center 400 are configured so as to be capable of transmitting and receiving information data, which includes image data, etc., to and from each other. The signal processing devices 8-1, 8-2, . . . , 8-$n$ and the communication units 9-1, 9-2, . . . , 9-$n$ are configured so as to include a CPU, ROM, RAM, etc., respectively, and carry out signal processing, such as data conversion and data compression, and processing, such as transmission and reception of information data, which includes image data etc., between the drive recorders 4-1, 4-2, . . . , 4-$n$ and the center 400. It is also possible to configure the communication units 9-1, 9-2, . . . , 9-$n$ by portable terminals, such as cellular telephones.

The drive recorders 4-1, 4-2, . . . , 4-$n$ of the vehicles 100-1, 100-2, . . . , 100-$n$ respectively transmit current position information, which is acquired by the GPS receivers 3-1, 3-2, . . . , 3-$n$, to the center 400 as part of information data at predetermined time intervals, and therefore, it is possible for the center 400 side to grasp the current position of each of the vehicles 100-1, 100-2, . . . , 100-$n$ one by one. Further, the drive recorders 4-1, 4-2, . . . , 4-$n$ of the vehicles 100-1, 100-2, . . . , 100-$n$ respectively create event information, which relates to the type of event (for example, an accident and disaster, weather, and obstacles) and the position of an event, based on the current position information, time information, and gravity acceleration information, explained later in detail, and transmit the created event information to the center 400. It is also possible for the respective drive recorders 4-1, 4-2, . . . , 4-$n$ of the vehicles 100-1, 100-2, . . . , 100-$n$ to create vehicle information, which relates to the behavior of the vehicle, such as the vehicle speed, acceleration, and braking operation, instead of creating the event information, and to transmit the created vehicle information to the center 400 so that the center 400 can create event information based on the vehicle information.

FIG. 2A, FIG. 2B, and FIG. 2C are diagrams each showing an example of event information. The event information is created each time an event occurs, and the example shown in FIG. 2A shows event information to the effect that fallen snow has occurred in Sannomiya at 18:12:37 on Feb. 21, 2010, the example shown in FIG. 2B shows event information to the effect that a traffic accident has occurred in Sannomiya at 18:34:15 on Feb. 21, 2010, and the example shown in FIG. 2C shows event information to the effect that an obstacle has occurred in Motomachi at 16:53:11 on Feb. 21, 2010.

If the center 400 side designates a vehicle and makes a request for image transmission, it is also possible to transmit image data, which is recorded in a driver recorder of the vehicle, to the center 400. Further, if a vehicle encounters an accident etc., it is possible to automatically transmit image data, which is recorded in the drive recorder of the vehicle, to the center 400.

Navigation devices 10-1, 10-2, . . . , 10-$n$, which are connected to the GPS receivers 3-1, 3-2, . . . , 3-$n$, etc., are also mounted on the vehicles 100-1, 100-2, . . . , 100-$n$, respectively. The navigation devices 10-1, 10-2, . . . , 10-$n$ read map data from the map data database and search for a travel route of the vehicles 100-1, 100-2, . . . , 100-$n$ on the map data. The navigation devices 10-1, 10-2, . . . , 10-$n$ can also communicate with the Internet connection provider 200 via the communication units 9-1, 9-2, . . . , 9-$n$, which are connected to the signal processing devices 8-1, 8-2, . . . , 8-$n$, respectively. Consequently, the signal processing devices 8-1, 8-2, . . . , 8-$n$ and/or the navigation devices 10-1, 10-2, . . . , 10-$n$ of the vehicles 100-1, 100-2, . . . , 100-$n$ and the center 400 are configured so as to be capable of transmitting and receiving information data including travel route information, which relates to the travel route, etc., to and from each other. The signal processing devices 8-1, 8-2, . . . , 8-$n$ and the communication units 9-1, 9-2, . . . , 9-$n$ also carry out the processing of transmission, reception, etc., of information data, which includes travel route information etc., between the navigation devices 10-1, 10-2, . . . , 10-*n* and the center 400, respectively.

The drive recorders 4-1, 4-2, . . . , 4-*n*, the signal processing devices 8-1, 8-2, . . . , 8-*n*, the communication units 9-1, 9-2, . . . , 9-*n*, and the navigation devices 10-1, 10-2, . . . , 10-*n* shown in FIG. 1A respectively function as a data transmission system on the vehicles 100-1, 100-2, . . . , 100-*n* side. In the present embodiment, the drive recorders 4-1, 4-2, . . . , 4-*n*, the signal processing devices 8-1, 8-2, . . . , 8-*n*, the communication units 9-1, 9-2, . . . , 9-*n*, and the navigation devices 10-1, 10-2, . . . , 10-*n* are described as separate parts, however, it may also be possible to configure these parts integrally.

The Internet connection provider 200 has a mobile communication network 202, which is connected to a plurality of base stations 201 and provides the connection service to the Internet 300 via a gateway 230, which is connected to the mobile communication network 202.

The center 400 has a control unit 401, a communication unit 402, such as a router for connecting to the Internets 300 and 500, a user profile information recording unit 403 configured to record user profile information, a content information recording unit 404 configured to record content information, which includes image data, travel route information, etc., a content selection history information recording unit 405 configured to record selection history information, etc., and each is configured so as to be capable of carry out transmission and reception of data to one another by a LAN 406.

The control unit 401 is configured by a personal computer, etc., and as will be explained in detail, configured to include an operation unit, which includes a CPU, RAM, ROM, keyboard, mouse, etc., a display unit, which includes a liquid crystal display, etc., a data recording unit, such as a hard disk, etc. The control unit 401 distributes various kinds of information to the vehicles 100-1, 100-2, . . . , 100-*n*, based on information received from the vehicles 100-1, 100-2, . . . , 100-*n* or external servers 600-1, 600-2, . . . , 600-*n*. Further, the center 400 accesses the Web site of the external servers 600, 700, and 800 via the Internet 500 at a predetermined timing, acquires various kinds of information, such as specific position information, which relates to a specific position and the circumstances of an event in the specific position, and accumulates the various kinds of information in the content information recording unit 404. Furthermore, the center 400 creates a user profile corresponding to a user (for example, the vehicles 100-1, 100-2, . . . , 100-*n*) who accesses the center 400, records the user profile in the user profile information recording unit 403, and records the various kinds of information, which is acquired each time of communication with a user, in the user profile information recording unit 403. Still furthermore, the center 400 records the content selection history information, which relates to the history of information of the content information recording unit 404 which is selected by the user who accesses the center 400, in the content selection history information recording unit 405.

In the present embodiment, the external server 600 functions as a traffic information center, and as the center 400 does, the external server 600 has a control unit 601, a communication unit 602, a user profile information recording unit 603, a content information recording unit 604, a content selection history information recording unit 605, etc., and each is configured so as to be capable of carrying out transmission and reception of data to one another by a LAN 606, however, the content information recording unit 604 records road traffic information, which includes a plurality of pieces of event information corresponding to a plurality of events, such as a traffic accident, as content information.

In the present embodiment, the external server 700 functions as a weather information center and as the center 400 does, the external server 700 has a control unit 701, a communication unit 702, a user profile information recording unit 703, a content information recording unit 704, a content selection history information recording unit 705, etc., and each is configured to be capable of carrying out transmission and reception of data so as to one another by a LAN 706, however, the content information recording unit 704 records weather information, which includes a plurality of pieces of event information corresponding to a plurality of events, such as fallen snow, as content information.

In the present embodiment, the external server 800 functions as an area information center which provides specific position information and as the center 400 does, the external server 800 has a control unit 801, a communication unit 802, a user profile information recording unit 803, a content information recording unit 804, a content selection history information recording unit 805, etc., and each is configured so as to be capable of carrying out transmission and reception of data to one another by a LAN 806, however, the content information recording unit 804 records specific position information as content information and a database to store the specific position information is constructed therein.

FIG. 3A, FIG. 3B, and FIG. 3C are diagrams each showing an example of specific position information. The specific position information is created for each specific position regardless of the presence/absence of an event, and the example shown in FIG. 3A shows that there are events of fallen snow and traffic accident in Sannomiya, the example shown in FIG. 3B shows that there is an event of obstacle in Motomachi, and the example shown in FIG. 3C shows that there is no event in Hyogo.

Figure 4:
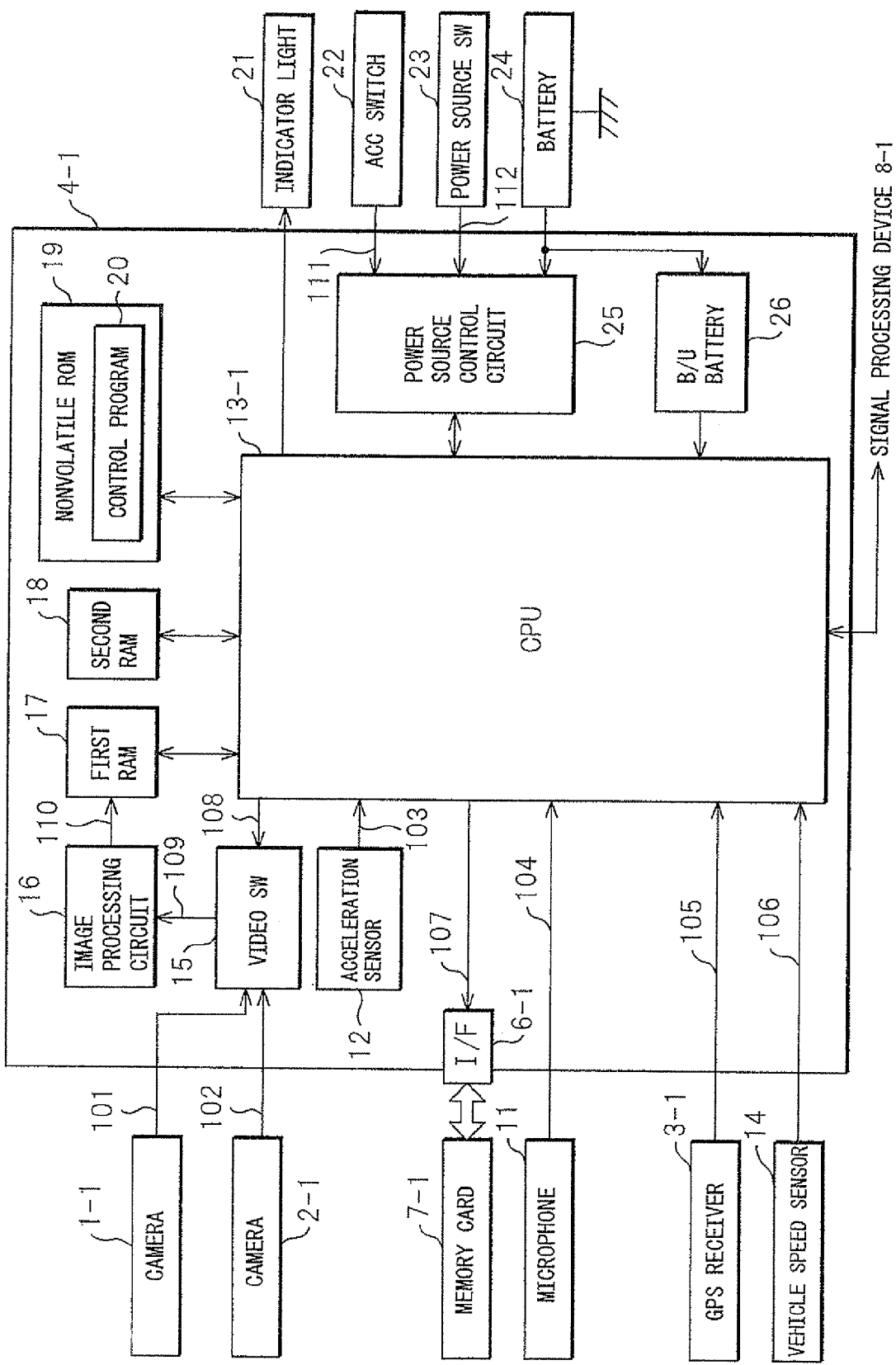
FIG. 4 is a block diagram of a drive recorder of FIG. 1A.

FIG. 4 is a block diagram of the drive recorder of FIG. 1A. In FIG. 4, the drive recorder 4-1 is explained, the driver recorders 402 and 403 have the same configuration and operation as those of the drive recorder 4-1, and therefore, explanation of the drive recorders 4-2 and 4-3 is omitted here.

It may possible to configure the drive recorder 4-1 as a device dedicated to video recording separately from the first camera 1-1 or the second camera 2-1, however, it may also be possible to integrate the drive recorder 4-1, the first camera 1-1, the second camera 1-2, and a microphone 11 by accommodating them in the same case.

The first camera 1-1 is controlled so as to photograph the front of the vehicle 100-1 and output an analog video signal as video information 101 and is configured by, for example, a CCD image sensor (Charge Coupled Device Image Sensor) or a CMOS image sensor (Complementary Metal Oxide Semiconductor Image Sensor) as a two-dimensional image sensor.

The second camera 1-2 is installed in the vehicle 100-1 as the second camera, and is controlled to photograph the direction different from that of the first cameral 1-1, such as the rear of the vehicle, the interior of the vehicle, etc., and output an analog video signal as video information 102. The second camera 1-2 is also configured by a CCD image sensor or a CMOS image sensor as a two-dimensional image sensor. If only one camera is necessary, it is not necessary to connect the second camera 1-2.

An acceleration sensor 12 is configured by a so-called G sensor (Gravity Acceleration Sensor) configured to detect the magnitude of an impact applied to the vehicle 100-1 as the gravity acceleration. The acceleration sensor 12 includes a semiconductor which generates a current, based on the gravity acceleration thereof, which is generated when an impact is applied thereto, detects the magnitude of the gravity acceleration in the longitudinal direction and the transverse direction of the vehicle, and outputs gravity acceleration information 103 to a CPU (Central Processing Unit) 13-1.

The memory card 7-1 is a recording medium which can be detached from the drive recorder 4-1 and is configured by a CF card (Compact Flash Card), which is a programmable nonvolatile semiconductor memory card, an SD card (Secure Digital Memory Card), a memory stick, etc.

In the present embodiment, a memory card is used as a detachable storage medium, however, this is not necessarily limited and it is also possible to use another detachable memory card, hard disk, etc., Further, it is possible to make use of the navigation device 10-1 mounted on the same vehicle 100-1, as a reproduction device. In that case, it is only required to transmit image data, which is recorded in the memory card 7-1, etc., to the navigation device 10-1 via a harness.

The microphone 11 is electrically connected to the CPU 13-1 and is configured to collect audio within or outside the vehicle 100-1 and transmit the audio to the CPU 13-1 as audio information 104. The audio information 104 is converted into a digital signal by an analog/digital converter within the CPU 13-1. It is preferable to use a single directional microphone the sensitivity of which toward the front of the microphone is high in order to prevent noises on the road from being collected unnecessarily.

The GPS receiver 3-1 receives electromagnetic wave signal, which includes orbits of satellites and time data from the atomic clock mounted on the satellite, from a plurality of GPS satellites, and obtains the current site information by calculating the relative distance difference to each satellite, based on the time difference of the received electromagnetic waves. It is possible to determine the position on the plane of the earth by capturing electromagnetic waves of three satellites. When the GPS receiver 3-1 detects the current site information, the GPS receiver 3-1 transmits GPS information 105, which consists of position information and time information, to the CPU 13-1.

A vehicle speed sensor 14 outputs the rotation of a rotor, which is provided on the wheel shaft of the vehicle 100-1, as a rotation pulse signal 106, and is configured by a magnetic sensor or an optical sensor. The CPU 13-1 calculates speed information of the vehicle 100-1 by calculating the number of rotations of the wheel per unit time, based on the pulse signal, which is received from the vehicle speed sensor 14.

The I/F 6-1 configures an insertion slot, i.e., a slot part of the memory card 7-1, which is provided in the drive recorder 4-1. The I/F 6-1 functions as a data recording unit configured to record recording information 107, which includes image data, etc., transmitted from the drive recorder 4-1, in the inserted memory card 7-1.

A video switch (hereinafter, referred to as "video SW") 15 is a switch for carrying out switching of the cameras used for photographing if a plurality of cameras is provided. In the present embodiment, the first camera 1-1 and the second camera 1-2 are connected to the video SW 15, and one of the cameras is selected by a selection signal 108 from the CPU 13-1. Video information from the selected camera is output as selected video information 109. It is also possible to provide the video SW15 with a timer function and carrying out the switching at a fixed time interval.

An image processing circuit 16 converts the selected video information 109, which is input from the first camera 1-1 and the second camera 1-2 via the video SW15, into a digital signal, creates image data 110, and outputs the image data 110. The image processing circuit 16 is configured by, for example, a JPEG-IC (Joint Photographic coding Experts Group—Integrated Circuit), and creates data in the JPEG format.

A first RAM 17 temporarily stores the image data 110, which is converted by the image processing circuit 16. The first RAM 17 is connected to a DMA (Direct Memory Access) circuit within the CPU 13-1.

A second RAM 18 continuously stores video information, which is converted into the image data 110 by an image processing circuit 16. As the first RAM 17 and the second RAM 18, for example, SDRAM (Synchronous Dynamic Random Access Memory) is used. Since the SDRAM is designed so as to operate in synchronization with clock of CPU, the wait time for input and output is short, and it is possible to carry out access at a speed higher than the conventional DRAM (Dynamic Random Access Memory), and the SDRAM is suitable to control the processing of a large capacity of video data at a high speed.

A nonvolatile ROM 19 stores a control program 20, etc., for totally controlling hardware resources, which configures the drive recorder 4-1. As the nonvolatile ROM 19, a mask ROM may be used, however, if a flash memory, which is a programmable nonvolatile semiconductor memory, EEPROM (Erasable Programmable Read Only Memory), a ferroelectric memory, etc., are used, it is possible to write or delete the program.

The control program 20 is stored in the nonvolatile ROM 19, is read by the CPU 13-1 at the time of activation of the drive recorder 4-1, and functions as a program for controlling each unit and carrying out data calculation processing.

An indicator light 21 consists of a light emission diode, etc., and lights up during the activation of the drive recorder 4-1 by supplying power from the CPU 13-1 and notifies a user that the drive recorder 4-1 is during activation. Further, the indicator light 21 notifies a user of an anomaly by blinking the indicator light 21 on and off by the CPU 13-1 if an anomaly occurs in the drive recorder 4-1.

An accessory switch (ACC switch) 22 is electrically integrated with a key cylinder for engine start, which is provided in the vehicle 100-1. When the switch is turned on by the key operation of a user, an accessory on signal 111 is transmitted from the ACC switch 22 to the drive recorder 4-1. Control action of the drive recorder 4-1 is started when the drive recorder 4-1 receives the accessory on signal 111 of the ACC switch 22. It is also possible to make use of an ignition key output signal in place of the output signal of the ACC switch 22.

A power source switch (power source SW) 23 transmits a power source on signal to the drive recorder 4-1 when the switch operation is carried out by a user. It is possible to use the power source SW 23 if it is requested to operate the drive recorder 4-1 without turning on the ACC SW 22.

A battery 24 is provided within the vehicle 100-1 and supplies power to the main body of the drive recorder 4-1. Further, the battery 24 supplies power to a power source control circuit 25 and a backup battery 26. The battery 24 may be a battery which can be mounted on the vehicle 100-1 and can generates an electromotive force of 12V.

The power source control circuit 25 is connected to the CPU 13-1 and supplies power from the battery 24 to each unit of the CPU 13-1 and the drive recorder 4-1 by receiving the on signal from the ACC SW 22. Further, if the power source control circuit 25 detects that the power source SW 23 is operated, the power source control circuit 25 starts supply of power regardless of the state of the ACC SW 22. Furthermore, the power source control circuit 25 transmits an end signal to the CPU 13-1 by detecting the off state of the ACC SW 22 or the power source SW 23. If the CPU 13-1 receives the end signal, the CPU 13-1 transmits an off signal to the power source control circuit 25, as an end processing of the control. Due to this, the power source control circuit 25 stops supply of power.

The backup battery (B/U battery) 26 is configured by a capacitor, etc., and is connected so as to supply power from the battery 24 to each unit of the CPU 13-1 and the drive recorder 4-1. If an impact is applied to the vehicle in a collision accident, etc., there is a possibility of damage of the battery 24 or breakage of the connecting line between the battery 24 and the power source control circuit 25. In this case, the B/U battery 26 carries out backup of the power source of the drive recorder 4-1 by supplying the accumulated power to the CPU 13-1, etc.

The CPU 13-1 operates as a control device of the drive recorder 4-1 and is configured by a microcomputer, etc., The CPU 13-1 carries out control of each unit of the drive recorder 4-1, data calculation processing, etc., based on the control program 20, creates vehicle information, and stores the created vehicle information in the second RAM 18. The CPU 13-1 can also create event information based on vehicle information and store the created event information in the second RAM 18.

Figure 5:
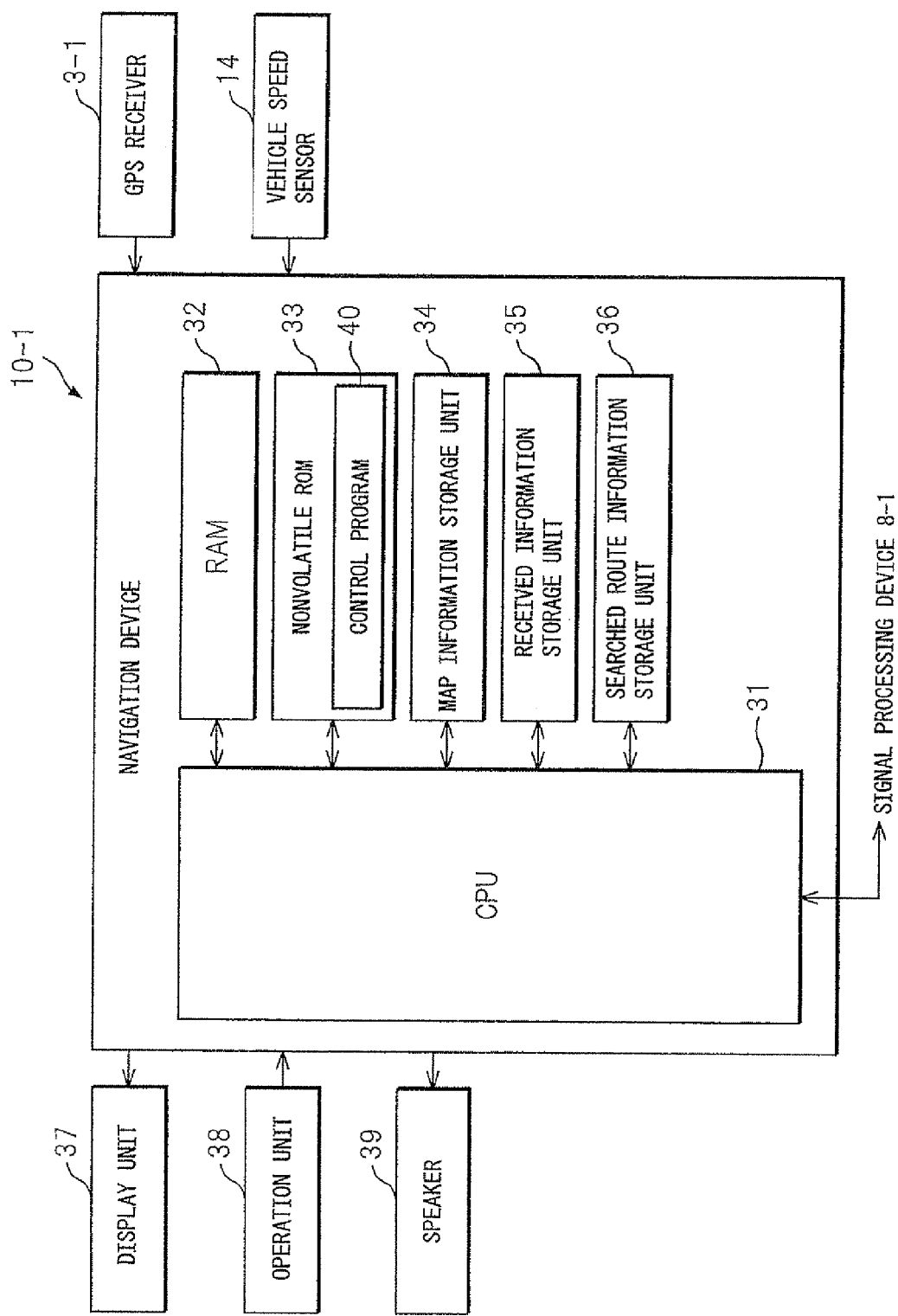
FIG. 5 is a block diagram of a navigation device of FIG. 1A.

FIG. 5 is a block diagram of the navigation device of FIG. 1A. In FIG. 5, the navigation device 10-1 is explained, the navigation devices 10-2 and 10-3 have the same configuration and operation as those of the navigation device 10-1, and therefore, explanation of the navigation devices 10-2 and 10-3 is omitted here.

The navigation device 10-1 has a CPU 31, a RAM 32, a nonvolatile ROM 33, a map information storage unit 34, a received information storage unit 35, a searched route information storage unit 36, etc., and is connected to a display unit 37, which is arranged in the vehicle 100-1 and configured by a liquid crystal display device, etc., an operation unit 38, which is configured by a touch panel, various buttons, etc., arranged on the display screen of the display unit 37, a speaker 39, which is arranged in the vehicle 100-1, the GPS receiver 3-1 for measuring the current position of the vehicle 100-1, the vehicle speed sensor 14 which outputs the rotation of the rotor, which is provided on the wheel shaft of the vehicle 100-1, as the rotation pulse signal 106, etc.

The navigation device 10-1 is configured so as to search for the current position of the vehicle and a route to the destination set by the operation unit 38 by making use of map data stored in a map information storage unit 419, based on the current position information of the vehicle, which is received by the GPS receiver 3-1 receives and the vehicle speed information on the basis of the vehicle speed pulse from the vehicle speed sensor 14, display the searched route on the display 10, and carry out the navigation operation for a driver.

Further, the navigation device 10-1 accesses the center 400, downloads most recent various kinds of information stored in the content information recording unit 404, and stores the information in the storage unit 33. Download of the most recent various kinds of information is carried out, for example, every predetermined period (every hour, every day, every week, etc.,) corresponding to the update date of most recent accident information in the center 400, etc., when a predetermined time elapses after the vehicle 100-1 is connected to the center 400.

The RAM 32 is used to temporarily store calculated values, etc., which is calculated by the CPU 31. As the RAM 32, for example, SDRAM is used. The nonvolatile ROM 33 stores a control program 40, etc., for totally controlling hardware resources, which configures the navigation device 10-1. As the nonvolatile ROM 33, for example, EEPROM, a ferroelectric memory, etc., are used.

The control program 40 is stored in the nonvolatile ROM 33, is read by the CPU 31 at the time of activation of the navigation device 10-1, and functions as a program for controlling each unit and carrying out data calculation processing.

The CPU 31 operates as a control device of the navigation device 10-1 and is configured by a microcomputer, etc., The CPU 31 carries out control of each unit of the navigation device 10-1, data calculation processing, etc., based on the control program 40.

The operation unit 38 is configured by a keyboard, a mouse, etc., and is made use of as a means for inputting an operation to the CPU 31 when an operator operates the navigation device 10-1.

The display unit 37 is configured by a liquid crystal display device, etc., and appropriately displays map data, searched route, etc., The speaker 39 is used to carry out audio guidance corresponding to map data, searched route, etc., displayed on the display unit 37.

The map information storage unit 34 is configured by a recording medium, such as a hard disk or DVD, and in which map information, which includes road information, speed limit information, etc., is recorded.

The received information storage unit 35 is configured by a recording medium, such as a hard disk, and is used to record various kinds of information received from the center 400. The searched route storage unit 36 is configured by a recording medium, such as a hard disk, and is used to store a searched route.

Figure 6:
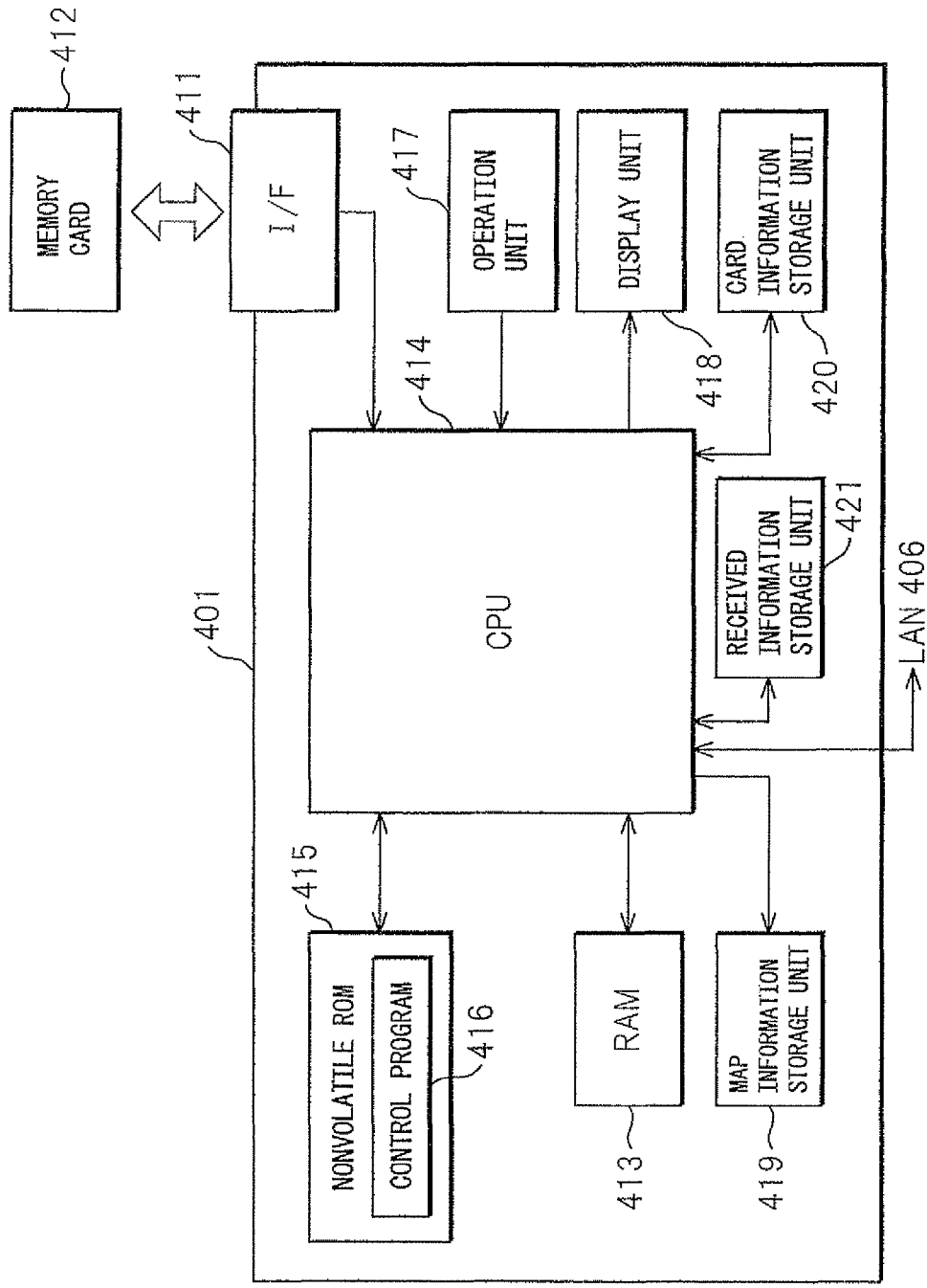
FIG. 6 is a block diagram of a center of FIG. 1B and a control unit of an external server of FIG. 1C.

FIG. 6 is a block diagram of the control unit of the center of FIG. 1B and the external server of FIG. 1C. In FIG. 6, the control unit 401 of the center 400 is explained, the control units 601, 701 and 801 of the external servers 600, 700 and 800 have the same configuration and operation as those of the control unit 401 of the center 400, respectively, and therefore, explanation of the control units 601, 701 and 801 of the external servers 600, 700 and 800 is omitted here.

The center 400 receives various kinds of information, such as specific position information, from the external servers 600, 700 and 800, and not only distributes various kinds of information, such as call attention information and call attention cancel information, to the vehicles 100-1, 100-2, . . . , 100-*n* but also verifies image data received from the drive recorders 4-1, 4-2, . . . , 4-*n*, which is mounted on the vehicles 100-1, 100-2, . . . , 100-*n* to find out the position of an event, the type of event, etc.

Figure 7:
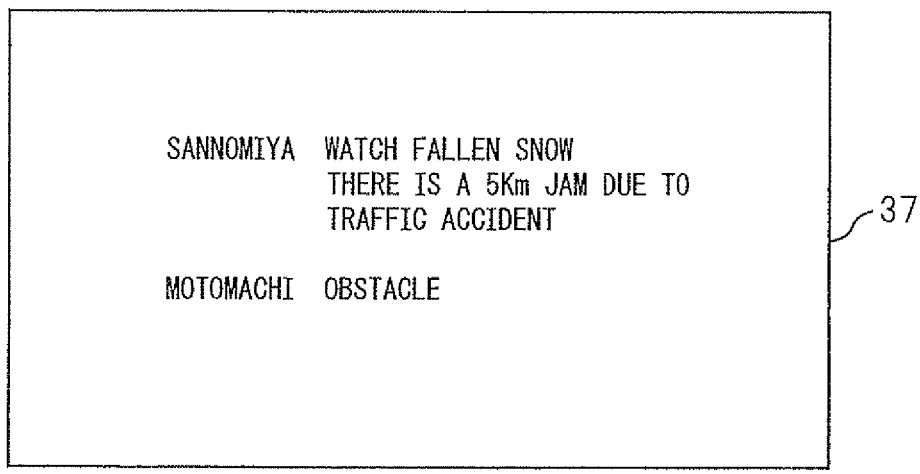
FIG. 7 is a diagram showing a display example of call attention information.

FIG. 7 is a diagram showing a display example of call attention information. The call attention information is created in the control unit 401 of the center 400 and plays not only a role to call attention of the vehicles 100-1, 100-2, . . . , 100-*n* to an event but also a role to notify the vehicles 100-1, 100-2, . . . , 100-*n* of the progression of the circumstances of the position where an event has occurred. When the call attention information is distributed to the navigation devices 10-1, 10-2, . . . , 10-*n*, the call attention information is displayed on the display unit 37 by the CPU 31 of the navigation devices 10-1, 10-2, . . . , 10-n. In the example shown in FIG. 7, the call attention information is displayed on the display unit 37, which notifies that there are fallen snow and a 5 km traffic accident jam in Sannomiya and an obstacle in Motomachi.

Figure 8:
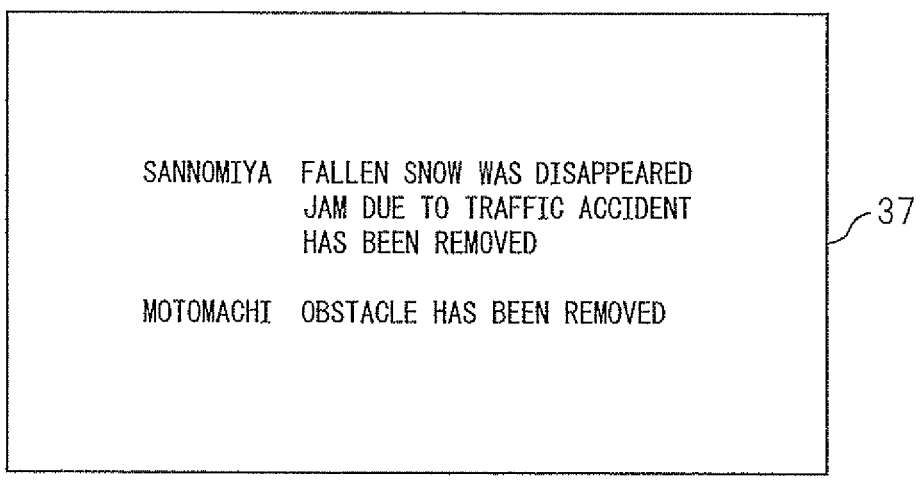
FIG. 8 is a diagram showing a display example of call attention cancel information.

FIG. 8 is a diagram showing a display example of call attention cancel information. The call attention cancel information is created in the control unit 401 of the center 400 and plays a role to cancel the attention called by the call attention information. When the call attention cancel information is distributed to the navigation devices 10-1, 10-2, . . . , 10-n, the call attention cancel information is displayed on the display unit 37 by the CPU 31 of the navigation devices 10-1, 10-2, . . . , 10-n. In the example shown in FIG. 8, the call attention cancel information, which notifies that there is no longer fallen snow in Sannomiya, there is no longer a traffic jam in Sannomiya and the obstacle in Motomachi has been removed, is displayed. It is also possible to individually notify that there is no longer fallen snow in Sannomiya, that there is no longer a traffic jam in Sannomiya, and that the obstacle in Motomachi has been removed by the call attention cancel information.

An interface (I/F) 411 configures an insertion slot, i.e., a slot part of a memory card 412, which is provided in the center 400. The interface (I/F) 411 transmits image information, etc., which is recorded in the memory card 412, to the center 400 side.

A RMA 413 temporarily stores data if a CPU 414 carries out image processing, etc., of image data, which is transmitted from the memory card 412. As the RAM 413, for example, SDRAM is used.

A nonvolatile ROM 415 stores a control program 416, etc., for totally controlling hardware resources, which configures the center 400. As the nonvolatile ROM 415, for example, EEPROM, a ferroelectric memory, etc., are used.

The control program 416 is stored in the nonvolatile ROM 415, is read by the CPU 414 at the time of activation of the center 400, and functions as a program for controlling each unit and carrying out data calculation processing.

The CPU 414 operates as a control device of the center 400 and is configured by a microcomputer, etc., The CPU 414 carries out controlling of each unit of the center 400, data calculation processing, etc., based on the control program 416.

An operation unit 417 is configured by a keyboard, mouse, etc., and is made use of as a means for inputting an operation to the CPU 414 if an operator operates the center 400.

A display unit 418 is configured by a liquid crystal display device, etc., and appropriately displays video information, etc., which is recorded in the memory card 412.

The map information recording unit 419 is configured by a recording medium, such as a hard disk or DVD, and records map information, which includes road information, speed limit information, etc.

A card information recording unit 420 is configured by a recording medium, such as a hard disk, and records video information, etc., which is recorded in the memory card 412. A received information storage unit 421 is configured by a recording medium, such as a hard disk, and records image data, which is received from the drive recorders 4-1, 4-2, . . . , 4-n, various kinds of information, etc., which is received form the external servers 600, 700, and 800.

Figure 9A:
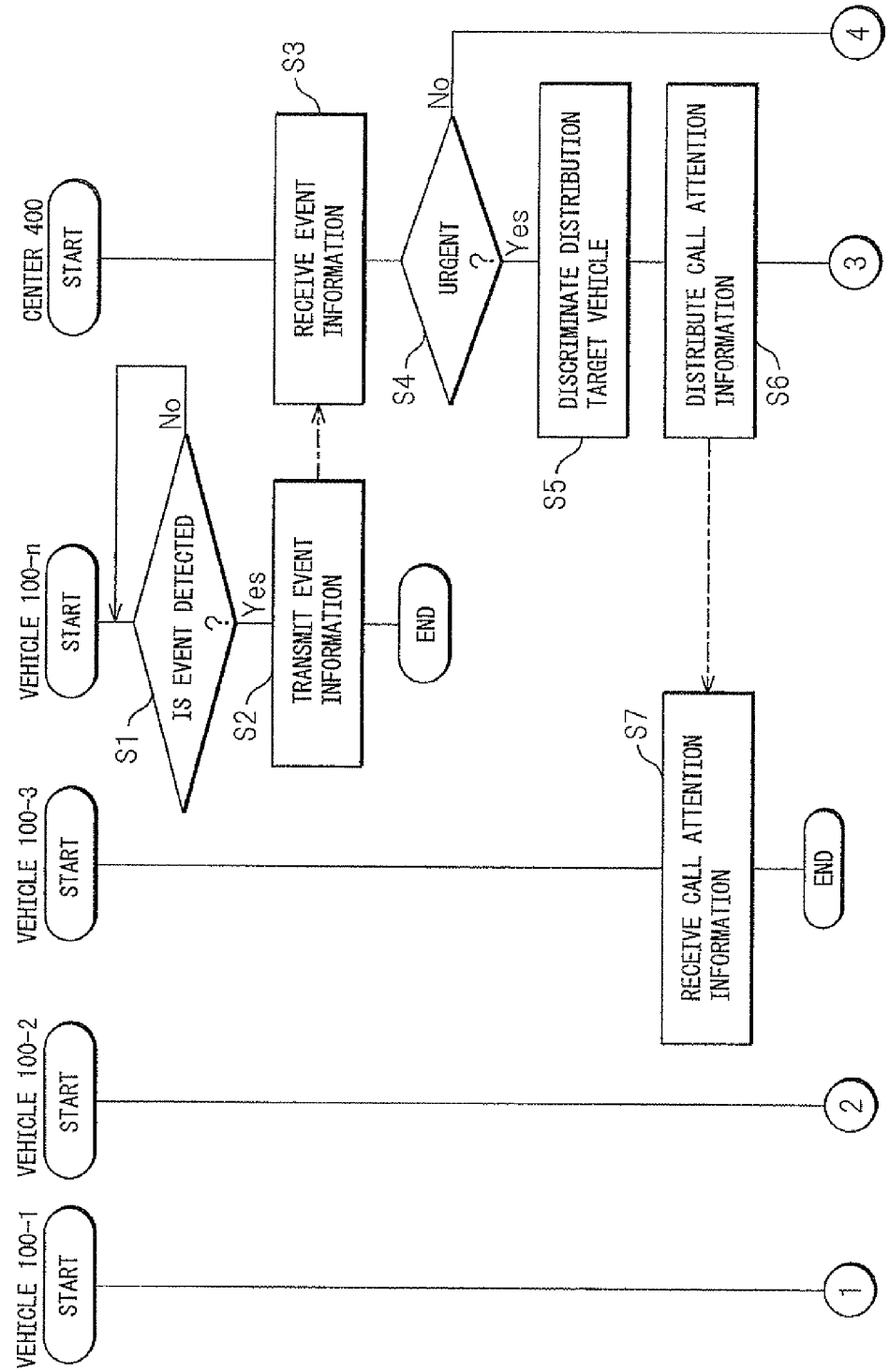

FIG. 9A and FIG. 9B are a flowchart of an example of the system operation. This flowchart is controlled by the program executed by the CPUs 13-1, 31, etc., on the vehicles 100-1, 100-2, . . . , 100-n side and controlled by the program executed by the CPU 414 on the center 440 side.

First, a CPU 13-n of the drive recorder 4-n of the vehicle 100-n determines whether or not an event is detected (step S1), and the CPU 13-n transmits event information, which is generated based on vehicle information, to the center 400 if the CPU 13-n determines that an event is detected (step S2).

For example, if the vehicle 100-n travels on a road in Sannomiya where there is fallen snow and the G value detected by the acceleration sensor when the vehicle 100-n slips is input to the CPU 13-n, the CPU 13-n compares the waveform of the detected G value and the reference waveform stored in the nonvolatile ROM 19 and determines that there is fallen snow based on the comparison result. Then, event information, which indicates that the type of event is fallen snow and the position (for example, Sannomiya) where fallen snow has occurred and the time (for example, at 18:12:37 on Feb. 2, 2010) is transmitted from the communication unit 9-n of the vehicle 100-n to the communication unit 402 of the center 400.

Then, the communication unit 402 of the center 400 receives the event information corresponding to the vehicle information (step S3). To do this, the communication unit 402 of the center 400 and the CPU 414 of the control unit 401 of the center 400 have the function as a first information acquisition unit configured to acquire event information (for example, at least one of vehicle information and weather information). Then, the CPU 414 of the control unit 401 of the center 400 determines whether or not to urgently distribute the call attention information to the vehicles 100-1, 100-2, . . . , 100-n, based on the type of event detected by the vehicle 100-n (step S4).

For example, if an event relates to weather, such as fallen snow, the necessity to urgently distribute the call attention information to the vehicles 100-1, 100-2, . . . , 100-n is not so pressing, and therefore, the CPU 414 of the control unit 401 of the center 400 does not distribute the call attention information to the vehicles 100-1, 100-2, . . . , 100-n. In contrast, if an event relates to an accident or disaster, the necessity to urgently distribute the call attention information to the vehicles 100-1, 100-2, . . . , 100-n is pressing, and therefore, the CPU 414 of the control unit 401 of the center 400 distributes the call attention information to the vehicles 100-1, 100-2, . . . , 100-n. Further, if an event relates to an obstacle, whether or not to distribute the call attention information to the vehicles 100-1, 100-2, . . . , 100-n is determined according to the size of the obstacle.

If the CPU 414 of the control unit 401 of the center 400 determines to distribute the call attention information to the vehicles 100-1, 100-2, . . . , 100-n, the CPU 414 of the control unit 401 of the center 400 discriminates a vehicle to which the call attention information is distributed (step S5), and distributes the call attention information to the distribution target vehicle (step S6). To do this, the CPU 414 of the control unit 401 of the center 400 has the function as a second call attention information distribution unit configured to distribute the call attention information to a vehicle based on event information (for example, vehicle information) and the function as first and second distribution target vehicle discrimination units configured to discriminate a vehicle to which the call attention information should be distributed, based on the source of transmission of the vehicle information and the position or travel route of the vehicle. The communication unit 9-3 of the vehicle 100-3, which is determined to be the distribution target vehicle, receives the call attention information (step S7).

FIG. 10 is a diagram for explaining an example of a reference of distribution of call attention information. According to the example shown in FIG. 10, if a vehicle is located one kilometer or more distant from the position of an event (for example, Sannomiya) and the vehicle is not navigated by a navigation device or the position of an event is not included in the searched route searched by a navigation device, the call attention information is not distributed and in other cases, the call attention information is distributed. Such a reference is stored in the nonvolatile ROM 415 as a map in order for the CPU 414 to refer to.

Figure 11A:
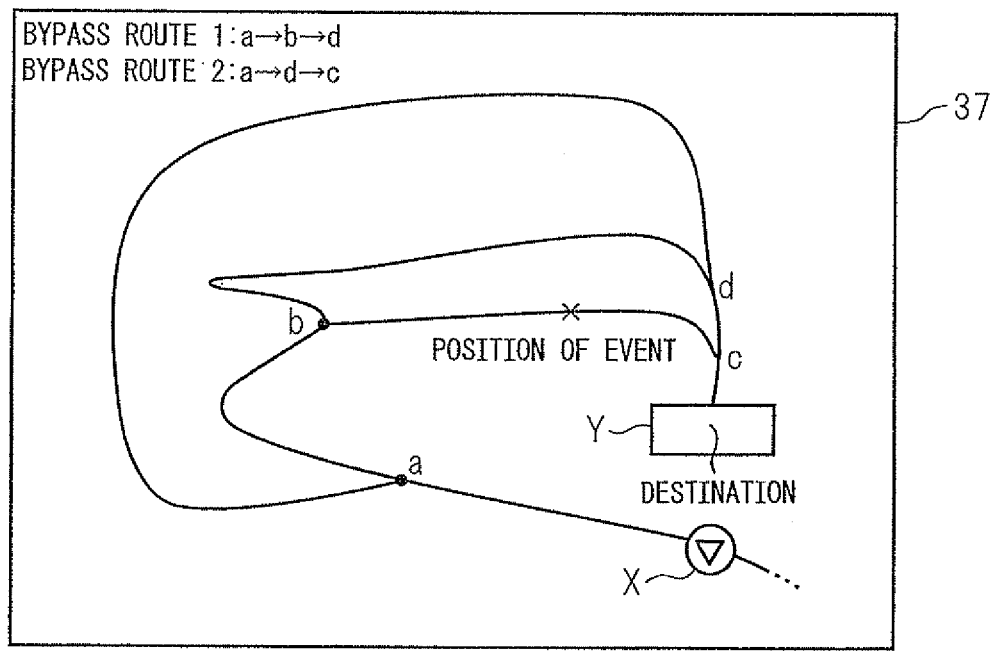
FIG. 11A and FIG. 11B are diagrams each showing an example of bypass information.
Figure 11B:
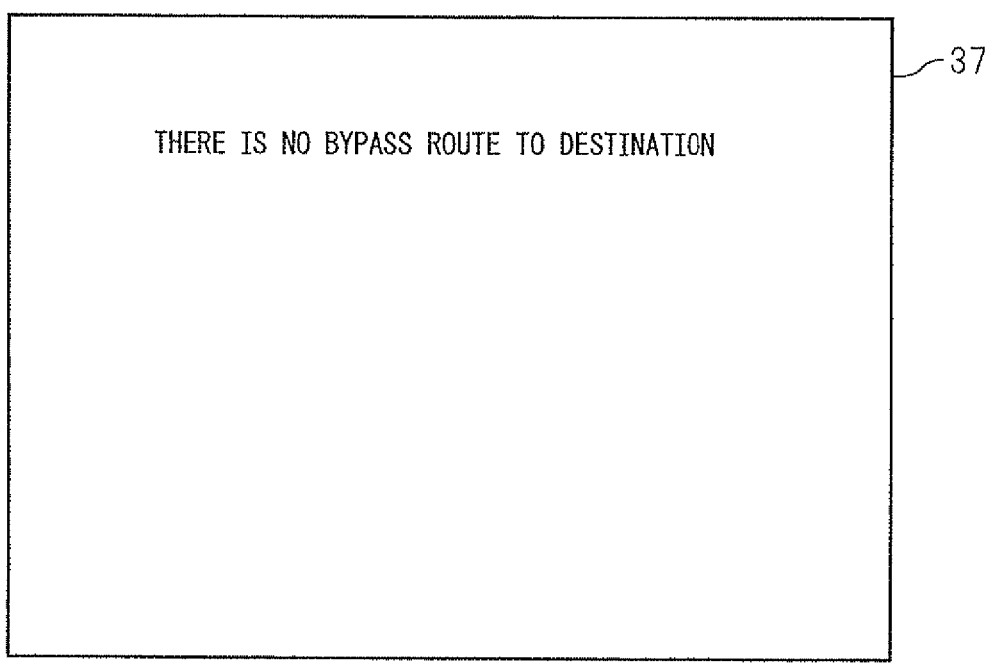

In the present embodiment, the center 400 distributes bypass information for notifying presence/absence of a means for bypassing the position of an event to the vehicles 100-1, 100-2, . . . , 100-n together with the call attention information. To do this, the CPU 414 of the control unit 401 of the center 400 has the function as a bypass information creation unit configured to create bypass information for notifying presence/absence of a means for bypassing an event which has occurred in the travel route of the vehicle, based on the vehicle position information and the travel route information, and the CPU 414 of the control unit 401 of the center 400 has the function as a bypass information distribution unit configured to distribute bypass information to a vehicle. Such bypass information is created by the CPU 414 of the control unit 401 of the center 400, based on vehicle position information and travel route information. FIG. 11A and FIG. 11B are diagrams each showing an example of a display of bypass information. In the example shown in FIG. 11A, as bypass means, bypass routes a→b→d and a→d→c are displayed on the display unit 37 of the navigation device 10-3 of the vehicle 100-3, and in the example shown in FIG. 11B, a message that means for bypassing the position of an event do not exist is displayed on the display unit 37 of the navigation device 10-3 of the vehicle 100-3.

In step S4, if the CPU 414 of the control unit 401 of the center 400 determines not to distribute the call attention information to the vehicles 100-1, 100-2, . . . , 100-n, i.e., if the CPU 414 of the control unit 401 of the center 400 determines that it is necessary to verify whether or not the event information accurately reflects the current circumstances of the position of an event, the CPU 414 of the control unit 401 of the center 400 discriminates a vehicle, which records an image in which the event position is photographed around a predetermined time when an event has occurred (for example, a period of time of five minutes), and then makes a request to the vehicle for the image (step S8). To do this, the CPU 414 of the control unit 401 of the center 400 has the function as an image transmission request determination unit configured to determine whether or not to make a request to a vehicle for transmission of image information, based on the acquired event information (for example, at least one of vehicle information and the weather information), and the communication unit 402 of the center 400 and the CPU 414 of the control unit 401 of the center 400 have the function as an output unit configured to output a request to a vehicle for transmission of image information if the CPU 414 of the control unit 401 of the center 400 determines to make a request for transmission of image information. Such discrimination of a vehicle can be carried out by referring to the history of the current position of the vehicles 100-1, 100-2, . . . , 100-n, which is acquired by the center 400. If there is no vehicle which records an image in which the event position is photographed around a predetermined time when an event has occurred, it is also possible to make the procedure proceed to step S5.

A CPU 13-2 of the drive recorder 4-2 of the vehicle 100-2 to which a request for an image is made, extracts an image in which the event position is photographed around the predetermined time when an event has occurred, from the memory card 7-2 (step S9) and transmits image information, which includes the extracted image, to the center 400 (step S10).

The communication unit 402 of the center 400 receives the image information, which includes the image in which the event position is photographed around the predetermined time when an event has occurred, from the vehicle 100-2 and the CPU 414 of the control unit 401 of the center 400 analyzes the image in order to verify whether or not the event information accurately reflects the current circumstances of the position of an event (step S11). To do this, the communication unit 402 of the center 400 and the CPU 414 of the control unit 401 of the center 400 have the function as a second information acquisition unit configured to acquire image information from a vehicle which has responded to the request for transmission of the image information. Such an analysis is carried out by comparing the image, which is included in the received image information and the reference image, which is stored in the nonvolatile ROM 415.

After the analysis of the image, the CPU 414 of the control unit 401 of the center 400 determines whether or not to distribute the call attention information to the vehicles 100-1, 100-2, . . . , 100-n, based on the image in which the event position is photographed around the predetermined time when an event has occurred, i.e., based on whether or not the event information accurately reflects the current circumstances of the position of an event (step S12). To do this, the CPU 414 of the control unit 401 of the center 400 has the function as a call attention information distribution determination unit configured to determine whether or not to distribute the call attention information to a vehicle, based on the acquired image information.

If the CPU 414 of the control unit 401 of the center 400 determines to distribute the call attention information to the vehicles 100-1, 100-2, . . . , 100-n, the CPU 414 of the control unit 401 of the center 400 creates the call attention information as shown in FIG. 7 (step S13), discriminates a vehicle to which the call attention information is distributed (step S14), and distributes the call attention information to the distribution target vehicle (step S15). To do this, the CPU 414 of the control unit 401 of the center 400 has the function as a first call attention information distribution unit configured to distribute the call attention information to a vehicle if the CPU 414 of the control unit 401 of the center 400 determines to distribute the call attention information to a vehicle. The communication unit 9-1 of the vehicle 100-1, which is determined to be the distribution target vehicle, receives the call attention information (step S16). In contrast, if the CPU 414 of the control unit 401 of the center 400 determines not to distribute the call attention information to the vehicles 100-1, 100-2, . . . , 100-n, the CPU 414 of the control unit 401 of the center 400 aborts distribution of the call attention information (step S17). To do this, the CPU 414 of the control unit 401 of the center 400 has the function as an call attention information distribution abort unit configured to abort distribution of the call attention information to a vehicle if the CPU 414 of the control unit 401 of the center 400 determines not to distribute the call attention information to a vehicle.

In the present routine, whether or not an event disappeared is determined after the CPU 414 of the control unit 401 of the center 400 distributes the call attention information, and if an event disappeared, it may also be possible to distribute the call attention cancel information, as shown in FIG. 8, to the vehicles 100-1, 100-2, . . . , 100-*n*.

According to the present embodiment, first, whether or not it is necessary to distribute the call attention information to a vehicle is determined based on the type of event immediately after the event information is received, and if it is determined that it is not necessary to distribute the call attention information, a request is made to a vehicle for the image in which the event position is photographed around the predetermined time when an event has occurred, and whether or not it is necessary to distribute the call attention information to a vehicle is determined again, based on the image in which the event position is photographed around the predetermined time when an event has occurred. Consequently, it is possible to provide an information distribution device capable of verifying whether or not the event information accurately reflects the current circumstances of the position of an event if urgent distribution of the call attention information is not requested. Further, only if it is determined that it is not necessary to distribute the call attention information, a request is made to a vehicle for an image, and therefore, the burden of the center 400 is reduced compared to the case where a request for an image is made each time the event information is received.

Figure 12A:
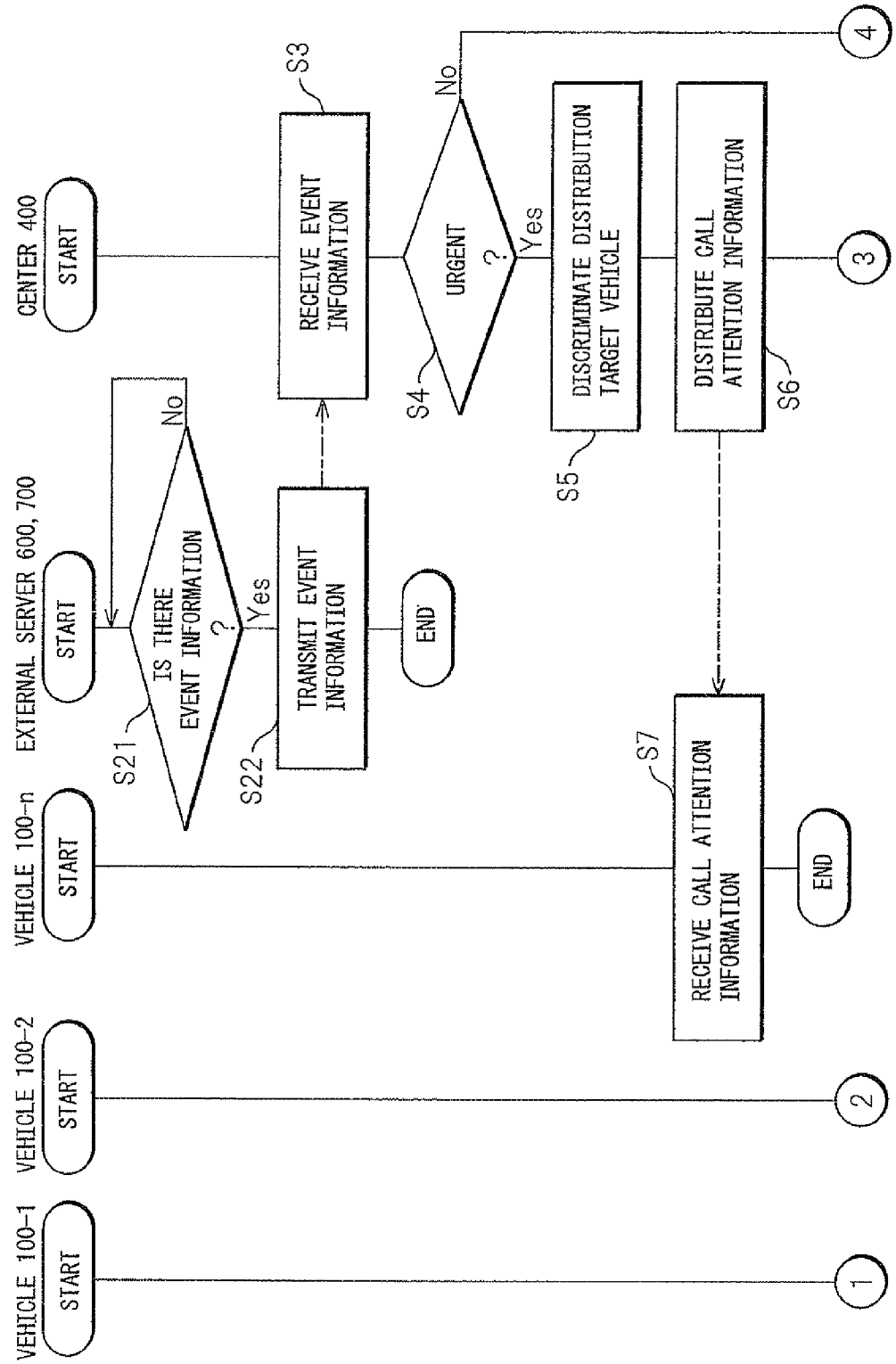

FIG. 12A and FIG. 12B are a flowchart of another example of the system operation. This flowchart is controlled by the program executed by the CPUs 13-1, 31, etc., on the vehicles 100-1, 100-2, . . . , 100-*n* side and controlled by the program executed by the CPU 414 on the center 400 side and the external servers 600 and 700 side.

In the example shown in FIG. 12A and FIG. 12B, the external servers 600 and 700 determine whether or not the event information exists in the external servers 600 and 700 (step S21), and if the external servers 600 and 700 determines that an event exists, the external servers 600 and 700 transmit event information to the center 400 (step S22).

Figure 13A:
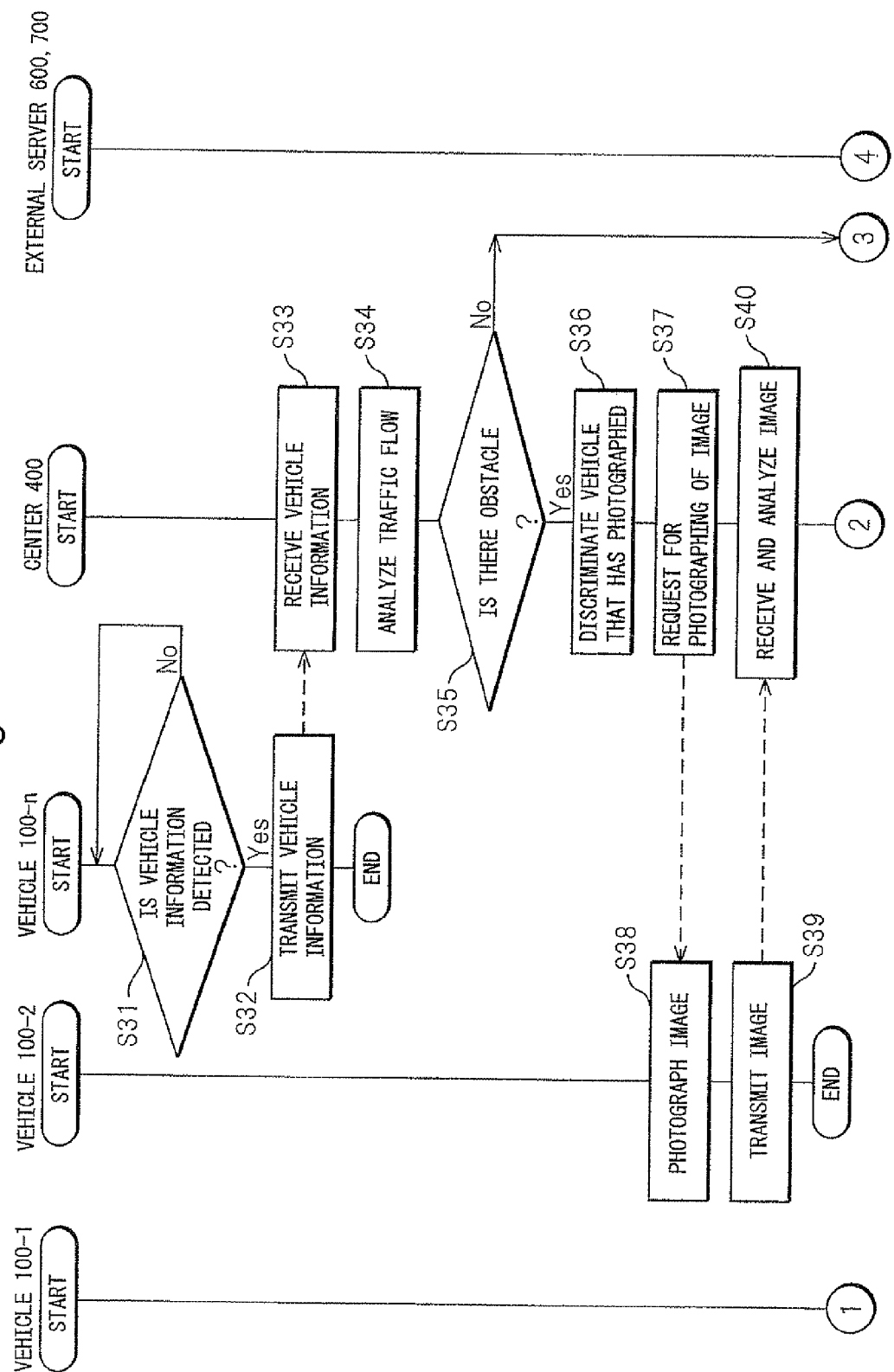
FIG. 13A and FIG. 13B are a flowchart of another example of the system operation.
Figure 13B:
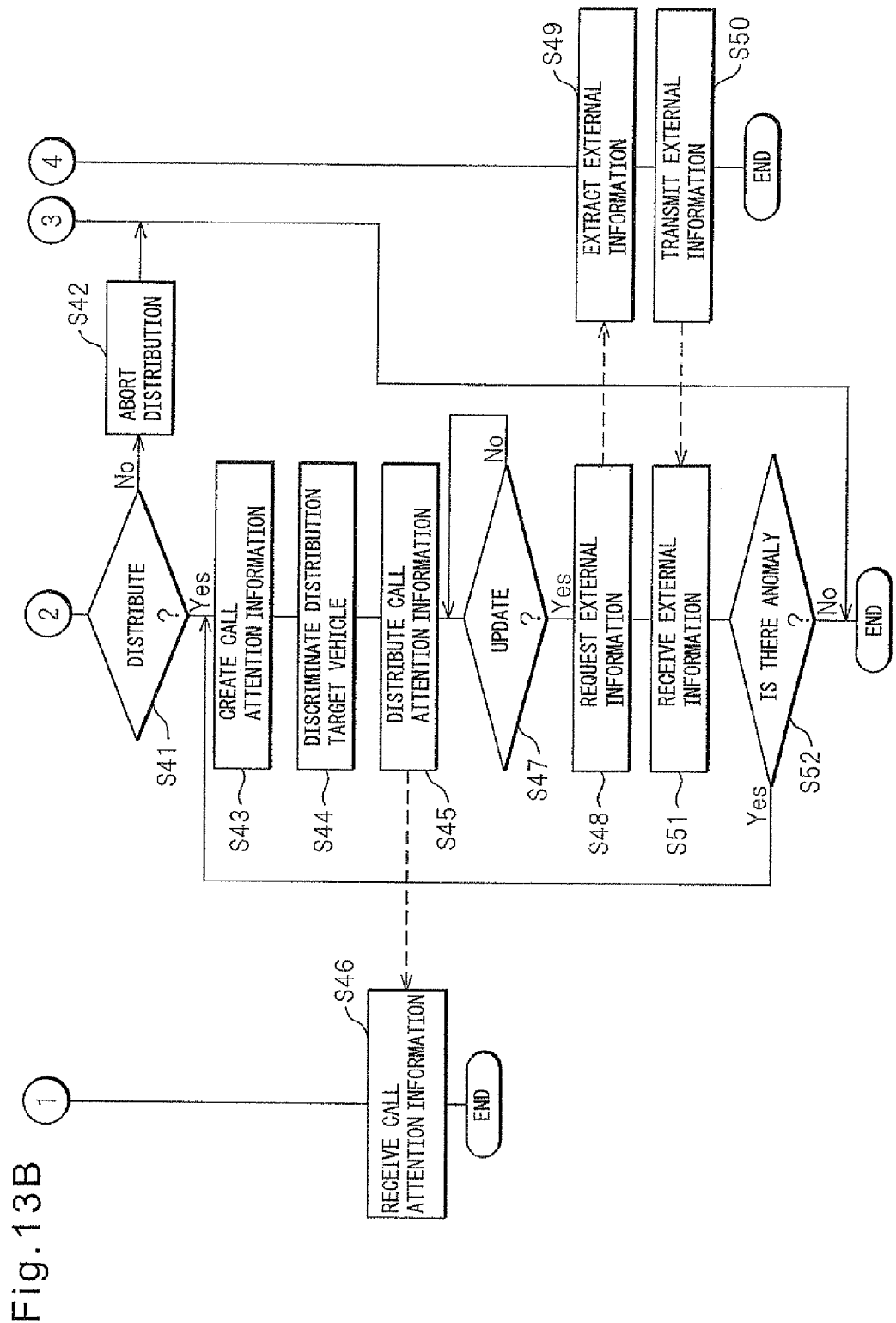

FIG. 13A and FIG. 13B are a flowchart of another example of the system operation. This flowchart is controlled by the program executed by the CPUs 13-1, 31, etc., on the vehicles 100-1, 100-2, . . . , 100-*n* side and controlled by the program executed by the CPU 414 on the center 400 side and the external servers 600 and 700 side.

First, the CPU 13-*n* of the drive recorder 4-*n* of the vehicle 100-*n* determines whether or not vehicle information is detected (step S31), and if the CPU 13-*n* of the drive recorder 4-*n* of the vehicle 100-*n* determines that vehicle information is detected, the CPU 13-*n* transmits vehicle information to the center 400 (step S32). Consequently, in steps S31 and S32, an upload timing of vehicle information is selected and the vehicle information is uploaded at the upload timing. The vehicle information has at least one of pieces of travel lane information indicative of the lane that the vehicle is traveling, a blinker lighting information indicative of lighting of a blinker, and obstacle sensor information indicative of detection of an obstacle, in addition to position information (latitude and longitude, link ID).

Then, the communication unit 402 of the center 400 receives vehicle information (step S33). To do this, the communication unit 402 of the center 400 and the CPU 414 of the control unit 401 of the center 400 have the function as an event information acquisition unit configured to acquire event information (for example, at least one of vehicle information and weather information). Then, the CPU 414 of the control unit 401 of the center 400 analyzes a traffic flow based on vehicle information (step S34) and determines whether or not there is an obstacle on the road based on the analysis result (step S35).

Whether or not there is an obstacle on the road is determined, based on travel lane information, blinker lighting information or obstacle sensor information, which are included in the vehicle information. If the CPU 414 of the control unit 401 of the center 400 determines whether or not there is an obstacle on the road based on the travel lane information, the CPU 414 of the control unit 401 of the center 400 determines that there is an obstacle on the lane by detecting signs that information, which relates to a specific lane, does not exist in any of a plurality of pieces of travel lane information. If the CPU 414 of the control unit 401 of the center 400 determines whether or not there is an obstacle on the road based on the blinker lighting information, the CPU 414 of the control unit 401 of the center 400 determines that there is an obstacle in the position by detecting signs that a plurality of pieces of blinker lighting information corresponding to the same position on the straight road, which is not the entrance of a shop, exists. If the CPU 414 of the control unit 401 of the center 400 determines whether or not there is an obstacle on the road based on the obstacle sensor information, the CPU 414 of the control unit 401 of the center 400 determines that there is an obstacle in the position by detecting a plurality of pieces of obstacle sensor information corresponding to the same position.

If the CPU 414 of the control unit 401 of the center 400 determines that there is no obstacle on the road, the present routine is exited. In contrast, If the CPU 414 of the control unit 401 of the center 400 determines that there is an obstacle on the road, i.e., if the CPU 414 of the control unit 401 of the center 400 determines that it is necessary to verify whether or not the current circumstance of the road are reflected accurately, the CPU 414 of the control unit 401 of the center 400 makes a request to a vehicle near the point, for which the determination that "there is an obstacle on the road" is made by the traffic flow analysis, for photographing of an image (upload of the photographed image) (step S37). To do this, the CPU 414 of the control unit 401 of the center 400 has the function as an image transmission request determination unit configured to determine whether or not to make a request to a vehicle for transmission of image information based on the acquired information, and the communication unit 402 of the center 400 and the CPU 414 of the control unit 401 of the center 400 have the function as an output unit configured to output a request to a vehicle for transmission of the image information if the CPU 414 of the control unit 401 of the center 400 determines to make a request for transmission of the image information.

In step S37, the selection of a vehicle, to which a request for photographing of an image is made, is carried out by the CPU 414 of the control unit 401 of the center 400, which designates vehicles traveling near the point while referring to the link ID and the longitude and the latitude of the point where the determination that "there is an obstacle on the road" is made and then selects at least part of the designated vehicles. The number of vehicles to select may be one, however, it is preferable to select a plurality of vehicles in view of the case where a photographed image is not available.

The CPU 13-2 of the drive recorder 4-2 of the vehicle 100-2 to which a request for an image is made photographs an image using the first camera 1-1 or the second camera 2-1 (step S38), and transmits the image information, which includes the photographed image, to the center 400 (step S39).

The communication unit 402 of the center 400 receives the image information from the vehicle 100-2, and the CPU 414 of the control unit 401 of the center 400 analyzes the image in order to verify whether or not there is an obstacle on the road in fact (step S40). To do this, the communication unit 402 of the center 400 and the CPU 414 of the control unit 401 of the center 400 have the function as an image information acquisition unit configured to acquire the image information from a vehicle which has responded to the request for transmission of the image information. Such an analysis is carried out by, for example, comparing the image, which is included in the received image information, and the reference image, which is stored in the nonvolatile ROM 415.

After the analysis of the image, the CPU 414 of the control unit 401 of the center 400 determines whether or not to distribute the call attention information to the vehicles 100-1, 100-2, . . . , 100-n according to whether or not an obstacle on the road can be confirmed based on the image, which is included in the received image information (step S41). To do this, the CPU 414 of the control unit 401 of the center 400 has the function as a call attention information distribution determination unit configured to determine whether or not to distribute the call attention information to a vehicle based on the acquired image information.

If the CPU 414 of the control unit 401 of the center 400 determines not to distribute the call attention information to the vehicles 100-1, 100-2, . . . , 100-n, i.e., if it is not possible to confirm an obstacle on the road based on the image, which is included in the received image information, the CPU 414 of the control unit 401 of the center 400 aborts the distribution of the call attention information (step S42), and exits the present routine. To do this, the CPU 414 of the control unit 401 of the center 400 has the function as a call attention information distribution abort unit configured to abort the distribution of the call attention information to a vehicle if the CPU 414 of the control unit 401 of the center 400 determines not to distribute the call attention information to a vehicle. It may also be possible to return to step S36 in order to make a request for photographing of an image again after the CPU 414 of the control unit 401 of the center 400 aborts the distribution of the call attention information in step S42.

In contrast, if the CPU 414 of the control unit 401 of the center 400 determines to distribute the call attention information to the vehicles 100-1, 100-2, . . . , 100-n, the CPU 414 of the control unit 401 of the center 400 creates the call attention information (step S43), discriminates a vehicle to which the call attention information is distributed (step S44), and the call attention information to the distribution target vehicle (step S45). To do this, the CPU 414 of the control unit 401 of the center 400 has the function as a first call attention information distribution unit configured to distribute the call attention information if the CPU 414 of the control unit 401 of the center 400 determines to distribute the call attention information to a vehicle.

The call attention information has information to the effect that "there is an obstacle which blocks traffic of a vehicle" and if it is possible to distribute a received image, the received image is included in the call attention information as an image by which an obstacle can be confirmed. Whether or not the received image can be distributed is determined based on whether the image satisfies the legal standard, such as the right of image or the Personal Data Protection Law, and if a person or number plate is photographed in the image, the resolution of the image is reduced or blurred to prevent a person from being identified.

The communication unit 9-1 of the vehicle 100-1, which has been determined to be a distribution target vehicle, receives the call attention information (step S46). In the present routine, whether or not an event disappeared is determined after the communication unit 9-1 of the vehicle 100-1 distributes the call attention information, and if an event disappeared, it is also possible to distribute the call attention cancel information for canceling the attention called by the call attention information to the vehicles 100-1, 100-2, . . . , 100-n.

Then, the CPU 414 of the control unit 401 of the center 400 determines whether or not to update the call attention information (step S47), and if the CPU 414 of the control unit 401 of the center 400 determines to update the call attention information, the CPU 414 makes a request to the external servers 600 and 700 for external information (step S48). Consequently, in steps S31 and S32, a timing to update the call attention information is selected and a request for the external information is made at the timing to update.

The control units 602 and 702 of the external servers 600 and 700 to which a request for the external information is made, extract the external information from the content information recording units 604 and 704 (step S49), and transmit the extracted external information to the center 400 (step S50). As the external information, traffic information near the point of an obstacle for determining whether or not an anomaly in traffic circumstances, such as a traffic jam, traffic restrictions or suspension of traffic due to the obstacle on the road has occurred, can be given, for example. If the CPU 414 of the control unit 401 of the center 400 makes a request for the traffic information as the external information, the CPU 414 of the control unit 401 of the center 400 makes a request to the external server 600, which functions as a traffic information center, for traffic information.

Then, the communication unit 402 of the center 400 receives the external information (step S51), and the CPU 414 of the control unit 401 of the center 400 determines whether or not there is an anomaly in the traffic circumstances based on the external information (step S52). If there is no anomaly in the traffic circumstances, the present routine is exited. In contrast, if there is an anomaly in the traffic circumstances, the procedure returns to step S43 in order to create the call attention information, which includes information to the effect that there is an anomaly in the traffic circumstances.

According to the present embodiment, an event is identified based on the event information, such as once collected vehicle information or weather information, and whether or not the identified event has occurred actually is confirmed again by collecting image information. If it is determined that an event has occurred actually by such confirmation, the center 400 distributes the call attention information. Consequently, it is possible to distribute the call attention information after whether or not an event has occurred is confirmed depending on circumstances.

Figure 14A:
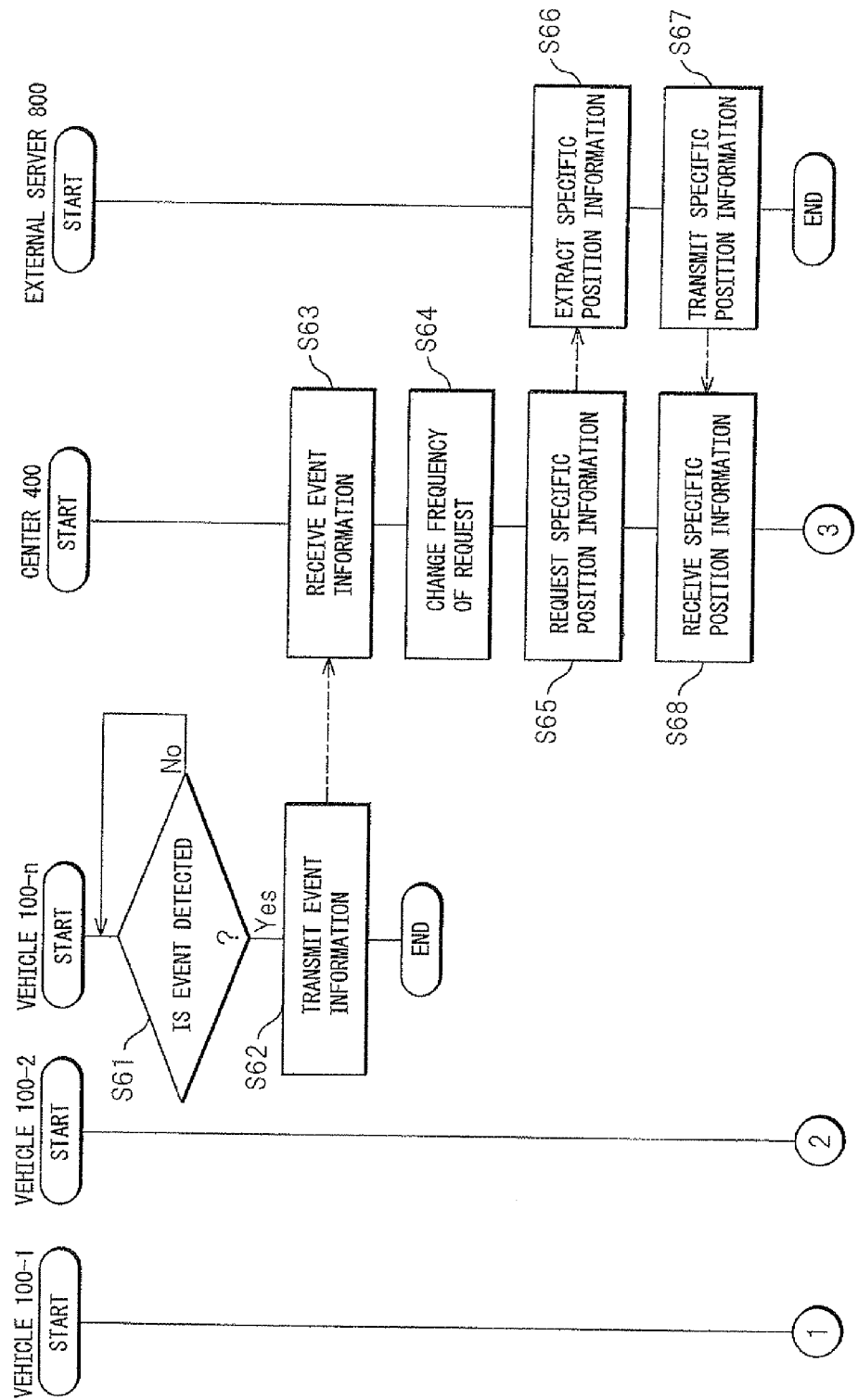

FIG. 14A and FIG. 14B are a flowchart of another example of the system operation. This flowchart is controlled by the program executed by the CPUs 13-1, 31, etc., on the vehicles 100-1, 100-2, . . . , 100-n side and is controlled by the program executed by the CPU 414 on the center 440 side and the external server 800 side.

First, the CPU 13-n of the drive recorder 4-n of the vehicle 100-n determines whether or not an event is detected (step S61). If the CPU 13-n of the drive recorder 4-n of the vehicle 100-n determines that an event is detected, the CPU 13-n transmits the event information to the center 400 (step S62).

For example, if the vehicle 100-*n* travels on a road in Sannomiya where there is fallen snow and the G value detected by the acceleration sensor when the vehicle 100-*n* slips is input to the CPU 13-*n*, the CPU 13-*n* compares the waveform of the detected G value and the reference waveform stored in the nonvolatile ROM 19, and determines that there is fallen snow based on the comparison result. Then, the event information, which indicates that the type of event is fallen snow and the position (for example, Sannomiya) where fallen snow has occurred and the time (for example, 18:12:37 on Feb. 2, 2010), is transmitted from the communication unit 9-*n* of the vehicle 100-*n* to the communication unit 402 of the center 400.

Then, the communication unit 402 of the center 400 receives the event information (step S63). To do this, the communication unit 402 of the center 400 and the CPU 414 of the control unit 401 of the center 400 have the function as an event information acquisition unit configured to acquire the event information from at least one of a vehicle and an external server. Then, the CPU 414 of the control unit 401 of the center 400 changes the frequency of requests to the external server 700 for specific position information so that the frequency of requests for the specific position information is higher than the frequency of requests for the specific position information before reception of the event information (step S64). To do this, the CPU 414 of the control unit 401 of the center 400 has the function to make the frequency of requests to an external server for the specific position information after acquisition of event information higher than the frequency of requests for the specific position information before acquisition of event information. The frequency of requests for the specific position information is changed by the CPU 414 of the control unit 401 of the center 400, which refers to a table showing a relationship between the detected events and the frequencies of requests stored in the nonvolatile program 415 of the control unit 401 of the center 400, as shown in FIG. 15.

Then, the CPU 414 of the control unit 401 of the center 400 makes a request to the external server 700 for the specific position information (step S65), the CPU 414 of the control unit 401 of the external server 800 extracts the specific position information from a database of the content information recording unit 804 (step S66), the communication unit 802 of the external server 800 transmits the specific position information to the center 400 (step S67), and the communication unit 402 of the center 400 receives the specific position information (step S68). To do this, the CPU 414 of the control unit 401 of the center 400 has the function as a specific position information acquisition unit configured to acquire the specific position information stored in an external server. Then, the CPU 414 of the control unit 401 of the center 400 determines whether or not the specific position information received this time is the same as the specific position information received previously and stored in the received information recording unit 421 (step S69).

If the CPU 414 of the control unit 401 of the center 400 determines that the specific position information received this time is not the same as the specific position information received previously and stored in the received information storage unit 421, the CPU 414 of the control unit 401 of the center 400 updates the specific position information received previously and stored in the received information storage unit 421 (step S70). To do this, the content information recording unit 404 has the function as a storage unit configured to store the specific position information, and the CPU 414 of the control unit 401 of the center 400 has the function as an update unit configured to compare the specific position information received from an external server and the specific position information already stored and update the specific position information if the specific position information received from the external server is different from the specific position information already stored.

Then, the CPU 414 of the control unit 401 of the center 400 determines whether or not an event in the specific position disappeared based on the specific position information (step S71). To do this, the CPU 414 of the control unit 401 of the center 400 has the function as an event determination unit configured to determine whether or not there is an event in a specific position based on the specific position information.

If the CPU 414 of the control unit 401 of the center 400 determines that an event in the specific position still remains, the CPU 414 of the control unit 401 of the center 400 creates the call attention information as shown in FIG. 7 (step S72), discriminates a vehicle to which the call attention information is distributed (step S73), and distributes the call attention information to the distribution target vehicle (step S74) and the procedure returns to step S65. To do this, the CPU 414 of the control unit 401 of the center 400 has the function as a call attention information distribution unit configured to discriminate a vehicle to which the call attention information should be distributed and distribute the call attention information to the vehicle if the CPU 414 of the control unit 401 of the center 400 determines that an event exists in a specific position. The communication unit 9-1 of the vehicle 100-1, which is determined to be a distribution target vehicle, receives the call attention information (step S75).

In contrast, if the CPU 414 of the control unit 401 of the center 400 determines that an event in the specific position disappeared, the CPU 414 of the control unit 401 of the center 400 creates the call attention cancel information as shown in FIG. 8 (step S76), discriminates a vehicle to which the call attention cancel information is distributed (step S77), and distributes the call attention cancel information to the distribution target vehicle (step S78). To do this, the CPU 414 of the control unit 401 of the center 400 has the function as a call attention cancel information distribution unit configured to discriminate a vehicle to which the call attention cancel information should be distributed and distribute the call attention cancel information to the vehicle if the CPU 414 of the control unit 401 of the center 400 determines that an event disappeared in a specific position. The communication unit 9-2 of the vehicle 100-2, which is determined to be a distribution target vehicle, receives the call attention cancel information (step S79).

Then, the CPU 414 of the control unit 401 of the center 400 changes the frequency of requests to the external server 700 for the specific position information to the same frequency of requests for the specific position information as the frequency of requests for the specific position information before reception of the event information (step S80). To do this, the CPU 414 of the control unit 401 of the center 400 has the function to return the frequency of requests to an external server for specific position information after distribution of the call attention cancel information to the frequency of requests for the specific position information before acquisition of the event information. The discrimination of a vehicle in step S77 and distribution of the call attention cancel information in step S78 are carried out in the same manner as the discrimination of a vehicle in step S73 and distribution the call attention information in step S74.

If it is determined that the specific position information is the same in step S69, the procedure proceeds to step S73 because of determining that an event in the specific position disappeared, however, it is also possible to omit step S73 and step S74.

According to the present embodiment, a request for the specific position information is made to an external server in which a database to the store specific position information, which relates to circumstances of an event in a specific position, is constructed, and the frequency of requests to the external server for the specific position information after reception of event information is higher than the frequency of requests to the external server for the specific position information before reception of event information. Consequently, it is possible to increase the frequency of requests to an external server for the specific position information as the necessity to acquire the specific position information, which relates to circumstances of an event in the specific position, increases.

Further, it is not necessary to increase the frequency of requests for specific position information in which no event exists if information is acquired from an external server in order to notify circumstances of an event to a vehicle, and therefore, it is possible to reduce the burden if information is acquired to notify circumstances of an event to a vehicle.

Figure 16A:
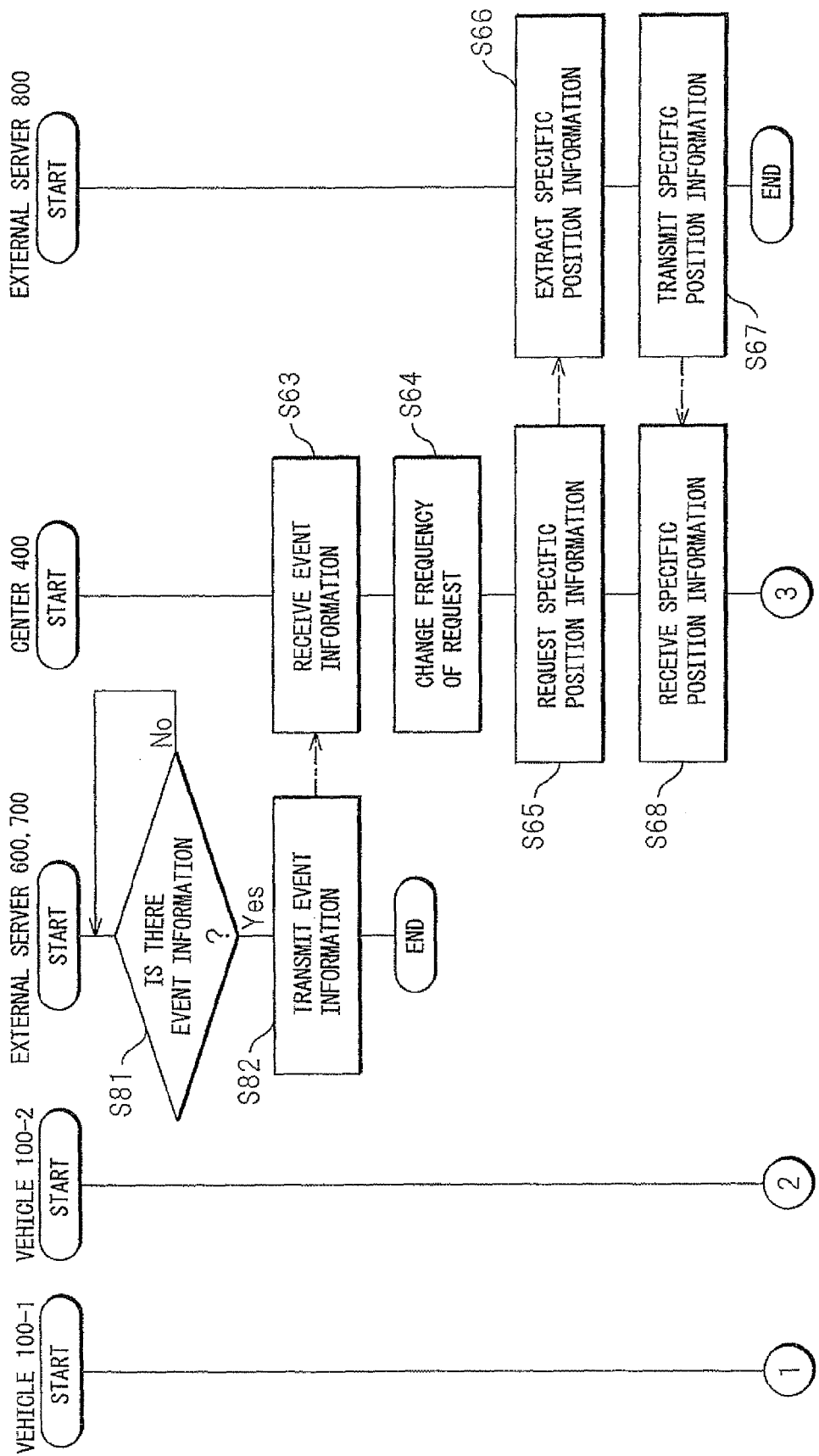

FIG. 16A and FIG. 16B are a flowchart of another example of the system operation. This flowchart is controlled by the program executed by the CPUs 13-1, 31, etc., on the vehicles 100-1, 100-2, . . . , 100-n side and is controlled by the program executed by the CPU 414 on the center 440 side and the external servers 600, 700, and 800 side.

In the example shown in FIG. 16A and FIG. 16B, the external servers 600 and 700 determine whether or not the event information exists in the external servers 600 and 700 (step S81), and transmit the event information to the center 400 if the external servers 600 and 700 determines that an event exists (step S82).

The invention claimed is:

1. An information distribution device which distributes call attention information for calling attention to an event to a distribution target vehicle, comprising:
a processor configured to:
acquire event information, which includes a type of an event, which relates to weather, an accident, a disaster or detection of an obstacle, and a position of occurrence of the event;
determine whether distribution of the call attention information is urgent or not urgent based on the type of event included in the acquired event information;
if the distribution of the call attention information is urgent, distribute the call attention information to the distribution target vehicle without making a request to another vehicle that is different than the distribution target vehicle for transmission of the image information; and
if the distribution of the call attention information is not urgent:
output the request for transmission of the image information to at least one other vehicle that is different than the distribution target vehicle;
acquire the image information from a vehicle that has responded to the request for transmission of the image information;
verify whether the acquired image information accurately reflects a current circumstance of the event information based on a comparison of the acquired image with a stored reference image; and
distribute the call attention information to the distribution target vehicle, if it is determined that the acquired image accurately reflects the current circumstance of the event information; and
do not distribute the call attention information to the distribution target vehicle, if the acquired image information does not accurately reflect the current circumstance of the event information.

2. The information distribution device according to claim 1, wherein the processor is further configured to: distribute the call attention information to the distribution target vehicle, based on acquired vehicle information.

3. The information distribution device according to claim 1, wherein the processor is further configured to: abort distribution of the call attention information to the distribution target vehicle, if it is determined not to distribute the call attention information to the distribution target vehicle.

4. The information distribution device according to claim 1, wherein the processor is further configured to:
create bypass information for notifying presence/absence of a means for bypassing an event that has occurred in the travel route of the vehicle, based on a position of the vehicle and the travel route of the vehicle; and
distribute the bypass information to the distribution target vehicle.

5. An information distribution device which distributes specific position information, which includes circumstances of an event in a specific position, and is stored in an external server, to a vehicle, comprising: a processor configured to:
acquire event information, which includes a type of an event, which relates to weather, an accident, a disaster or detection of an obstacle, and a position of occurrence of the event, from at least one of a vehicle and an external server; and
acquire the specific position information stored in the external server based on the position of the event included in the acquired event information, wherein
the processor makes a frequency of request to the external server for the specific position information after acquisition of the event information higher than the frequency of requests to the external server for the specific position information before acquisition of the event information,
the frequency of requests is defined as once per a certain number of minutes, which is determined based on the type of the event, and
the frequency of requests when the type of the event relates to the detection of the obstacle is greater than the frequency of requests when the type of the event relates to the weather and the frequency of requests when the type of the event relates to the accident or the disaster is greater than the frequency of requests when the type of the event relates to the detection of the obstacle.

6. The information distribution device according to claim 5, wherein the processor is further configured to:
store the specific position information in a memory; and
compare the specific position information received from the external server and the specific position information stored in the memory and update the specific position information if the specific position information received from the external server is different from the specific position information stored in the memory.

7. The information distribution device according to claim 6, wherein the processor is further configured to:

determine whether or not an event exists in the specific position, based on the specific position information; and discriminate a vehicle to which call attention cancel information for cancelling call of the attention to an event should be distributed and distribute the call attention cancel information to the vehicle if it is determined that an event does not exist in the specific position.

8. The information distribution device according to claim 7, wherein the processor is further configured to: return the frequency of requests to the external server for the specific position information after distribution of the call attention cancel information to the frequency of requests to the external server for the specific position information before acquisition of the event information.

9. The information distribution device according to claim 6, wherein the processor is further configured to:

determine whether or not an event exists in the specific position, based on the specific position information; and discriminate a vehicle to which call attention information for calling attention to an event should be distributed and distribute the call attention information to the vehicle if it is determined that an event exists in the specific position.

10. The information distribution device according to claim 1, wherein the distribution target vehicle is discriminated based on at least one of a source of transmission, a position of the vehicle, and a travel route of the vehicle.

* * * * *